United States Patent
Kobayashi

(12) 
(10) Patent No.: US 6,373,816 B1
(45) Date of Patent: Apr. 16, 2002

(54) OPTICAL DISK FABRICATING METHOD, OPTICAL DISK, AND OPTICAL DISK APPARATUS

(75) Inventor: Shoei Kobayashi, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/455,209

(22) Filed: Dec. 6, 1999

Related U.S. Application Data

(62) Division of application No. 09/076,224, filed on May 12, 1998, now Pat. No. 6,091,700.

(30) Foreign Application Priority Data

May 19, 1997 (JP) ............................................. 9-127730

(51) Int. Cl.$^7$ ................................................ G11B 7/24
(52) U.S. Cl. ................... 369/275.4; 369/275.3
(58) Field of Search .......................... 369/275.4, 275.3, 369/275.1, 13, 32, 124, 48, 50, 54, 44.25, 44.26, 275.2

(56) References Cited

U.S. PATENT DOCUMENTS

| | | | |
|---|---|---|---|
| 5,930,228 A | * | 7/1999 | Miyamoto et al. ....... 369/275.4 |
| 6,091,700 A | * | 7/2000 | Kobayashi ............... 369/275.4 |

* cited by examiner

*Primary Examiner*—Ali Neyzari
(74) *Attorney, Agent, or Firm*—Frommer Lawrence & Haug LLP; William S. Frommer; Bruno Polito

(57) ABSTRACT

An optical disk apparatus providing for effective use of a disk's information recording surface and allowing for high density access. The apparatus is operable on disks of the land/groove type, wherein the width of lands and grooves is approximately equal, and the disks have a track pitch of 0.64 $\mu$m or less and a light transmission layer between 10 $\mu$m and 177 $\mu$m thick. The apparatus features a working distance which is no greater than 560 $\mu$m and a numerical aperture which is at least 0.78.

10 Claims, 17 Drawing Sheets

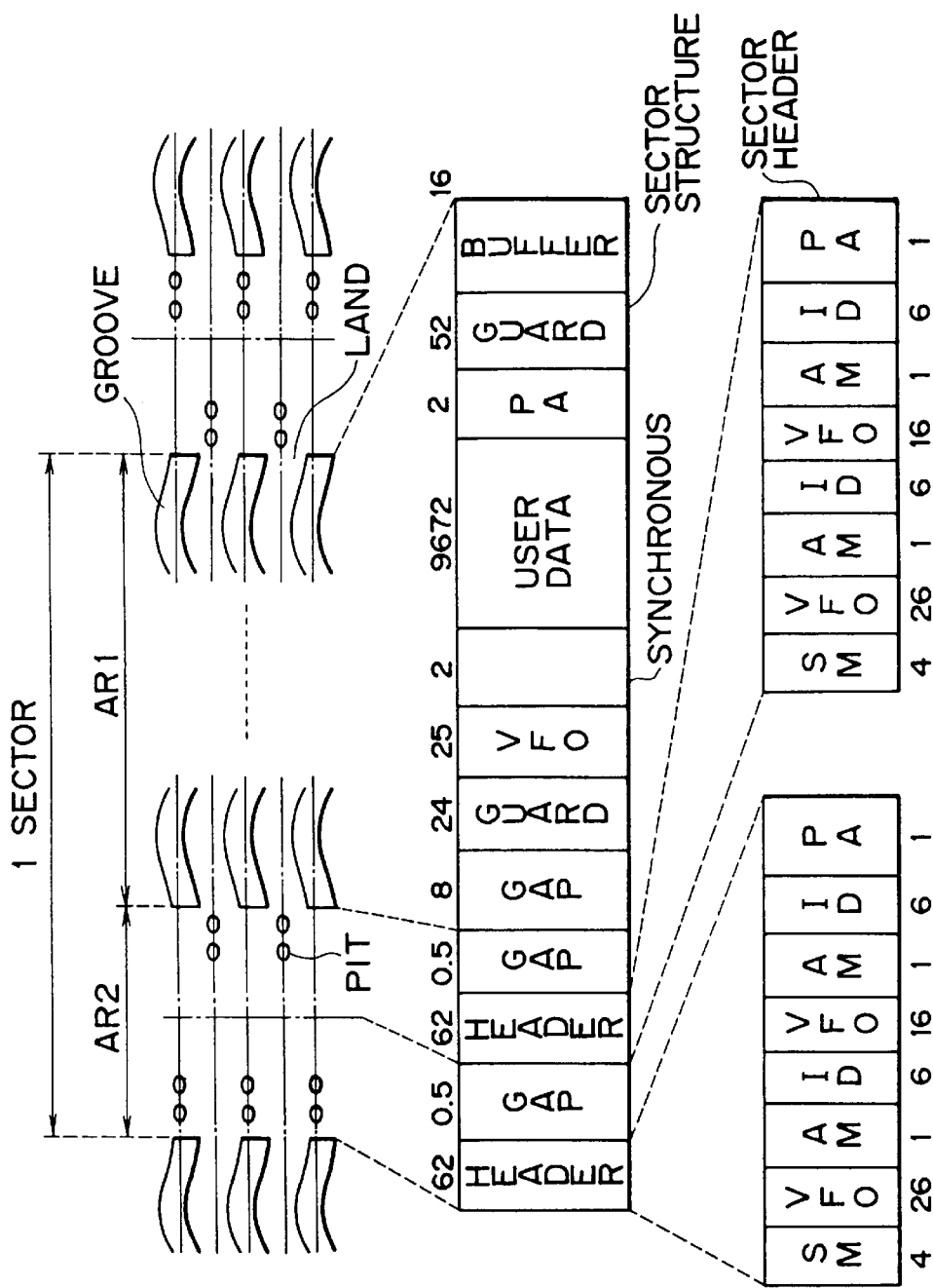
F I G. 3A
F I G. 3B
F I G. 3C1
F I G. 3C2

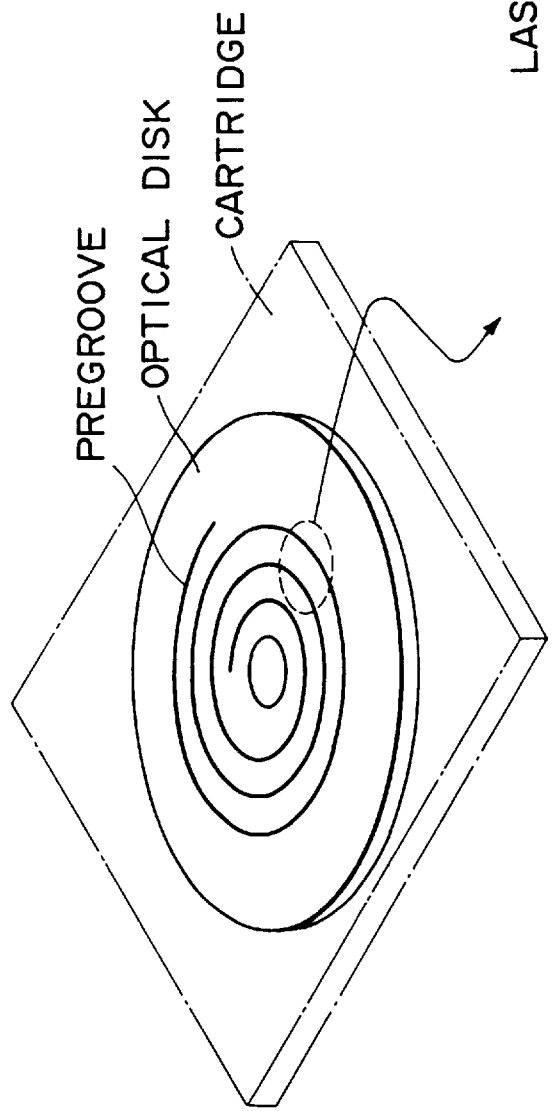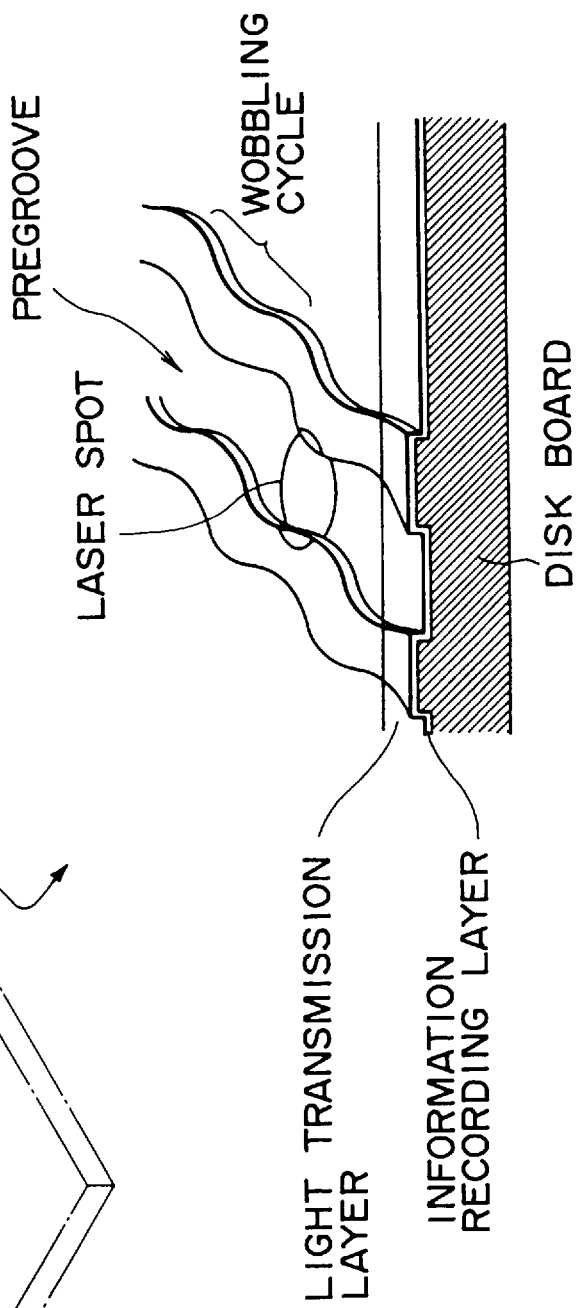

FRAME STRUCTURE

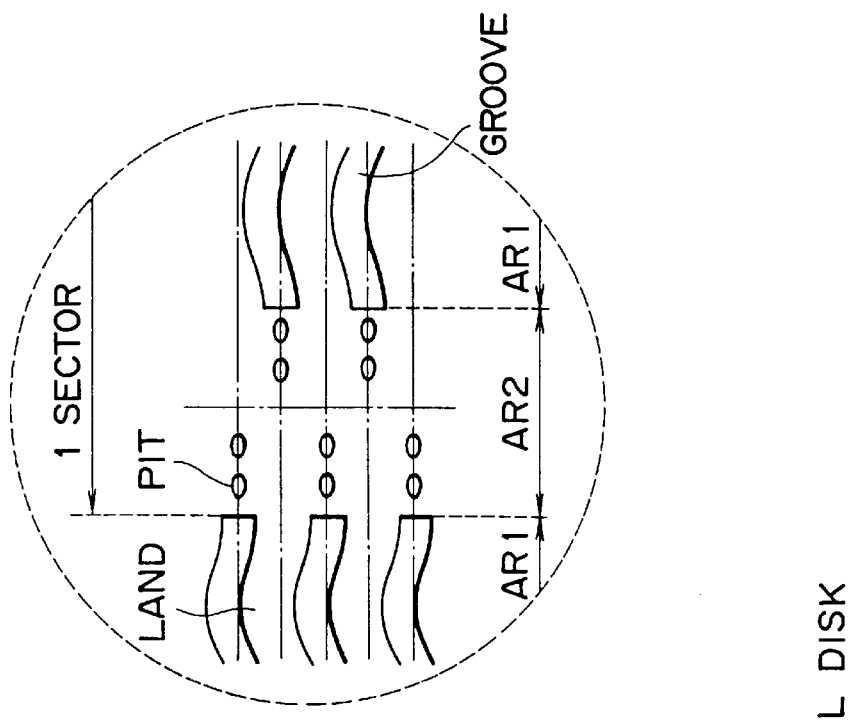
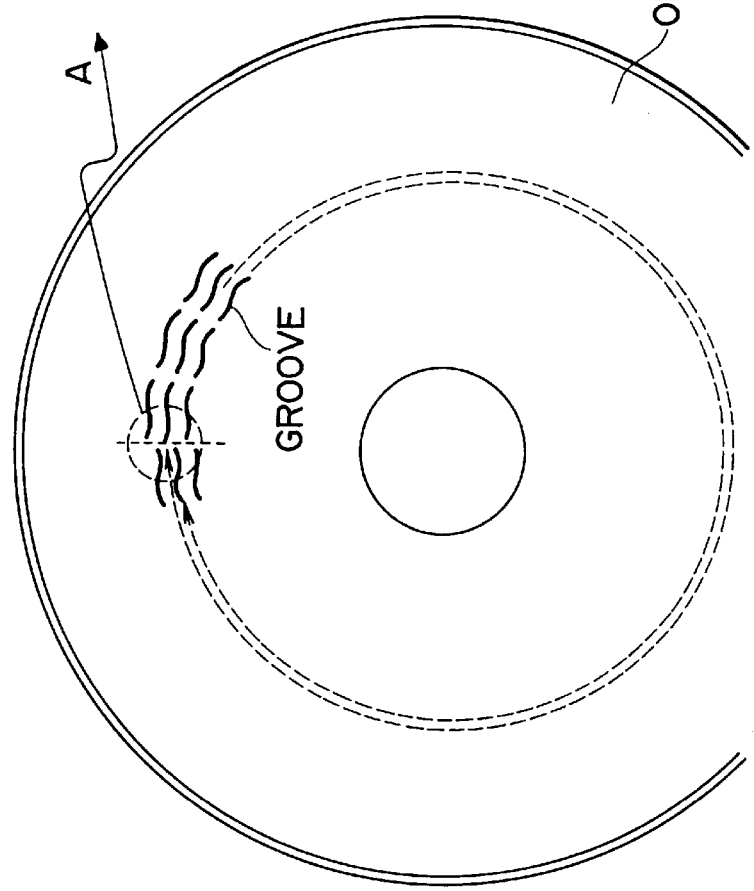

OPTICAL DISK FABRICATING METHOD, OPTICAL DISK, AND OPTICAL DISK APPARATUS

Continuing Application Divisional of prior application Ser. No. 09/076,224, filed May 12, 1998 is now U.S. Pat. No. 6,091,700.

BACKGROUND OF THE INVENTION

This invention relates to an optical disk fabricating method, optical disk, and optical disk apparatus, and more particularly, to the fabrication, recording and reproduction of optical disks that have been formed according to the so-called land/groove technique.

Currently, the DVD (Digital Versatile Disc) is being proposed as an optical disk apparatus for recording information at high density. The DVD is designed to be able to record 2.6 GB of data on a single side, the recording being performed by irradiating a laser beam having a wavelength of 650 nm onto an optical disk through an optical system having a numerical aperture of 0.6. Using this technique, about one hour's worth of image signals can be recorded on a single side of a disk.

However, a typical home video tape recorder (VTR) has a basic recording time of two hours. Thus, in order for DVD's to become a viable substitute for VTRs, they must be provided with the capability to store more data. For example, although editing or the like can be performed by effectively using the characteristic functions of optical disk such as random access, about three hours' worth of image signal must be recorded in order to make DVDs desirable. In the case of a DVD system, a three hour recording time means that the disk should be capable of storing about 8 GB of data.

For this reason, it is necessary to make effective use of the information recording surface of an optical disk.

SUMMARY OF THE INVENTION

The present invention has been made with the above points in mind. Accordingly, an object of the invention is to provide an optical disk fabricating method, optical disk, and optical disk apparatus which permit effective use of the information recording surface of the disk, thereby allowing data to be recorded at higher density than before.

A technique for fabricating an optical storage disk according to the invention involves providing a base disk having a transparent layer and a recording layer, the transparent layer having a thickness between 10 $\mu$m and 177 $\mu$m; and irradiating the base disk with a laser beam so as to form a multiple of recording tracks on the recording layer, the tracks being substantially concentric about the center of the base disk, having a track pitch of 0.64 $\mu$m or less, and alternating radially between land tracks and groove tracks, wherein each land track is located on the surface of the recording layer and each groove track is located within a groove on the surface of the recording layer.

When the invention is applied to an apparatus accessing the type of optical disk described above, groove tracks and land tracks are accessed by irradiating the laser beam onto the disk via an optical system having a numerical aperture of 0.78 or more with a working distance being set to 560 $\mu$m or less. The rotation speed of the optical disk may be switched in stages from the inner circumferential side to outer circumferential side of the optical disk by noting the irradiation position of the laser beam.

Forming the light transmission layer with a thickness of 10 $\mu$m to 177 $\mu$m allows an optical system having a high numerical aperture to read data from the disk; and data can be recorded at high density. By spirally forming tracks with a pitch of 0.64 $\mu$m or less on the information recording surface, the information recording surface can be effectively used, thereby helping to improve recording density. Recording density may be further improved by ensuring that the width of a groove and that of a land are equal or almost equal.

In the optical disk apparatus of the invention, the recording density advantages of the above-described disk are realized by accessing groove tracks and land tracks. Moreover, by switching the rotation speed of the optical disk in relation to the radial position of the irradiating laser, additional recording density advantages may be realized.

BRIEF DESCRIPTION OF THE DRAWINGS

FIGS. 3A to 3C2 are schematic diagrams showing the configuration of a sector as depicted in FIG. 1.

FIG. 4 is a perspective view of an optical disk produced by the mastering apparatus in FIG. 1.

FIG. 16 is a plan view used for explanation of sectors formed by a mastering apparatus according to an additional embodiment of this invention.

DESCRIPTION OF THE PREFERRED EMBODIMENTS

Hereinafter, embodiments of the present invention will be described in detail with reference to the accompanying drawings.

Figure 2:
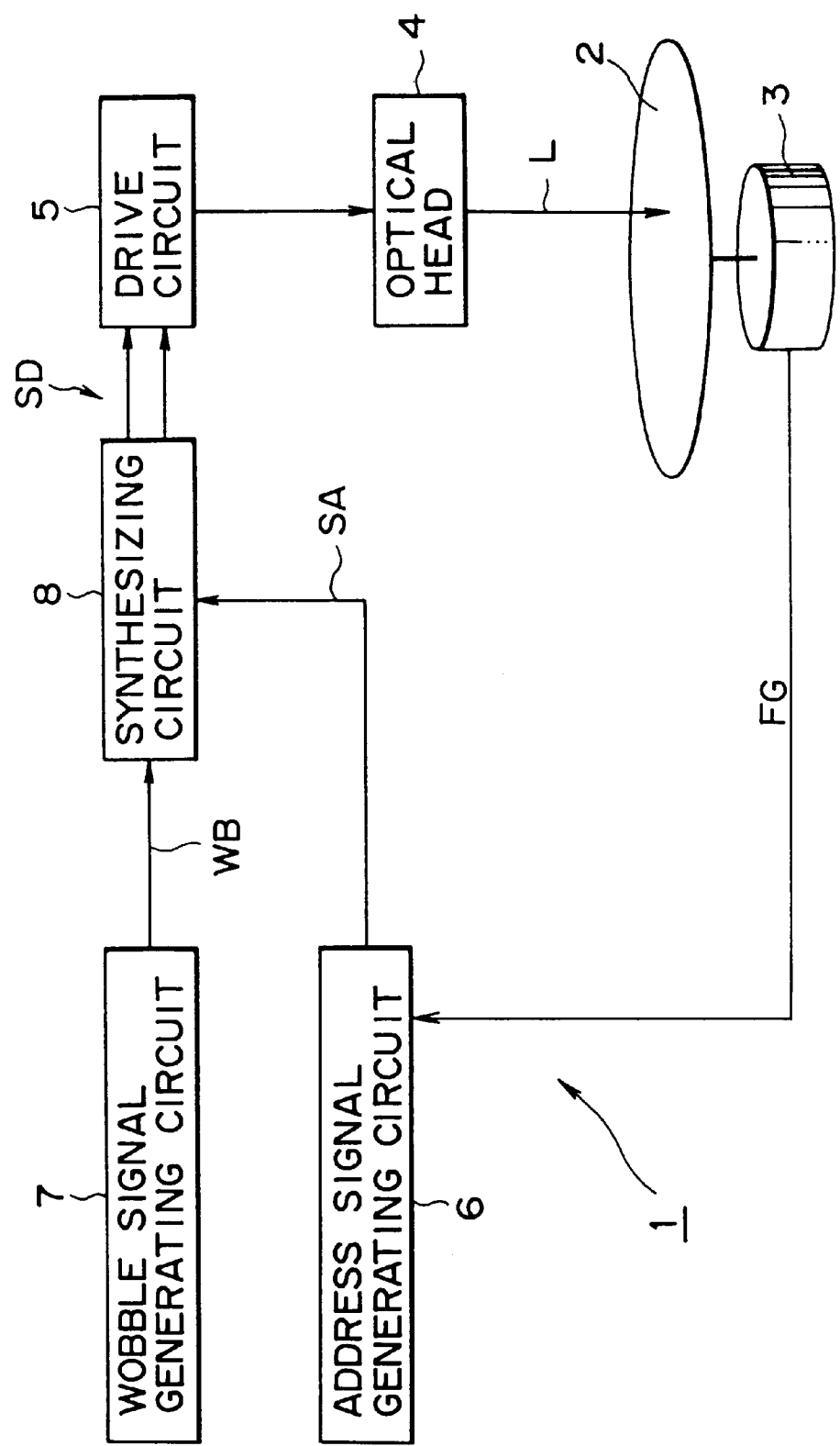
FIG. 2 is a block diagram showing a mastering apparatus applied to zone recording in FIG. 1.

FIG. 2 is a block diagram showing a mastering apparatus according to a first embodiment of the present invention. In the optical disk fabricating process of this embodiment, a source disk 2 is exposed to light by the mastering apparatus 1 and an optical disk is produced from the source disk 2.

In the mastering apparatus 1, the source disk 2 (e.g. a glass plate coated with a resist) is rotationally driven at a constant angular velocity by a spindle motor 3.

An optical head 4 irradiates a laser beam L onto the source disk 2 as the head is moved by a sled mechanism from the inner circumferential position to the outer circumferential position of the source disk 2. Irradiating the disk in this manner, as the disk rotates, allows the optical head 4 to form spiral tracks which run from the inner circumferential position to the outer circumferential position of the source disk 2. The optical head 4 is controlled by the sled mechanism to move in the radial direction by about 1.0 µm per rotation of the source disk 2 so that tracks are formed with a track pitch of 0.5 µm in the case of land/groove recording. For comparing purposes, it is noted that in the case of DVD land/groove recording, the track pitch is 0.74 µm.

In the system of FIG. 2, the mastering apparatus 1 can record data on optical disks produced from the source disk 2 at a track recording density of about 0.21 µm/bit. An expression relating the recording density of an optical disk produced from source disk 2 and a DVD disk is shown below.

$$4.7 \times 0.74 \times 0.267/(0.5 \times 0.21) \quad (1)$$

In the above expression, the number 4.7 is the recording capacity (GB) of DVD and the numbers 0.74 and 0.267 are the track pitch (µm) and track recording density (µm/bit) of DVD, respectively. The numbers 0.5 and 0.21 are the track pitch (µm) and track recording density (µm/bit), respectively, of a disk produced from source disk 2. Accordingly, the expression (1) shows recording density according to the FIG. 2 embodiment when the same data processing as for DVD is performed. The value of the expression is >8 GB, and thus a disk produced from source disk 2 can record more than 8 GB of data.

The optical head 4 sets the spot diameter of laser beam L so that, when optical disks are produced from the source disk 2, the grooves formed by exposure to laser beam L and the lands between adjacent grooves are almost equal in width. The spot shape and light quantity of the laser beam are set so that the effective exposure area of the beam is about 120% of the desired groove width. In this manner, the optical head 4 exposes the source disk 2 to the laser beam such that the resulting optical disks are capable of land/groove recording.

Further, the optical head 4 is constructed so that it is movable in the radial direction of the source disk 2.

Figure 1B:
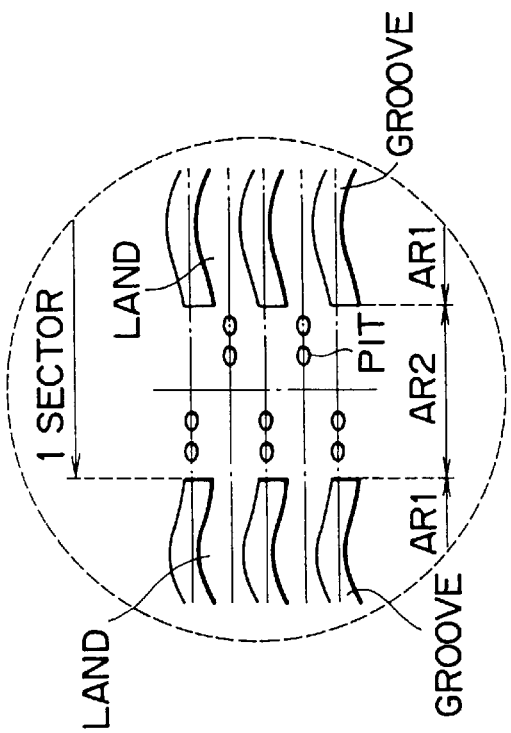
FIG. 1 is a plan view provided for explanation of zone recording by a mastering apparatus according to a first embodiment of this invention.
Figure 1A:
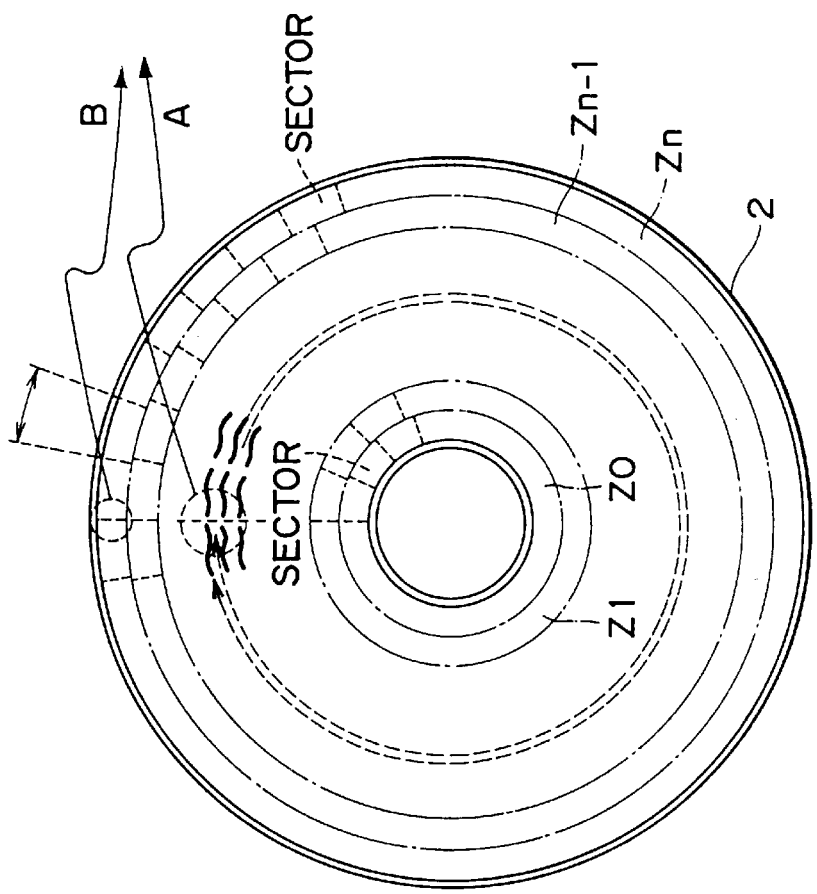

A drive circuit 5 drives the optical head 4 in response to a drive signal SD. The drive circuit 5 switches the conditions of driving the optical head 4 according to the position of the irradiating laser beam and the rotation of the source disk 2, thereby generating a zoned source disk 2 as shown in FIG. 1. FIG. 1 provides a detailed view of a portion of the zoned disk showing the lands, grooves and pits.

The mastering apparatus 1 forms tracks on the source disk 2 so that an area of 24 to 58 mm in radius is allocated on the information recording surface of an optical disk that is 120 mm in diameter. Furthermore, the drive circuit 5 switches the conditions of driving the optical head 4 so that the information recording surface is split into circumferential areas referred to as sectors. Further, by changing the switching timing in stages from the inner circumferential track to the to outer circumferential track of the disk, the information recording surface is concentrically split into a multiple of radial zones (Z0 to Zn).

With this construction, nine sectors are formed per track in the innermost zone Z0 and the number of sectors per track increases by one each time there is a shift from one zone to its neighboring outer zone (e.g. from Z0 to Z1).

An enlarged view of a sector boundary (e.g. boundary associated with arrow A or B) is provided in FIG. 1. As can be seen, the leading portion of a sector is allocated in address area AR2 and the remaining area (or "user area") is allocated in area AR1. The drive circuit 5 radially shifts the position of the laser beam in the user area AR1 according to the drive signal SD under control of a system control circuit (not shown), thereby forming wobbled grooves in the user area AR1.

The shifting of the laser beam position is suspended in the first half of the address area AR2 and the light quantity from the laser beam is increased intermittently by the drive signal SD to form a pit train on the center of a groove track. In the second half of address area AR2, the laser beam position is shifted to the center of an inner land track and the light quantity from the laser beam is increased intermittently by the drive signal SD to form a pit train on the center of the land track.

With this construction, the drive circuit 5, in the first half of address area AR2, records the address data of a following groove sector on a corresponding track center by a pit train, and in the second half of address area AR2, the drive circuit records the address data of a following inner land sector on a corresponding track center by a pit train.

When optical disks are produced from the source disk 2, the drive circuit sets the light quantity of the laser beam such that the depth of pit and groove is ⅙ to ⅕ of the 650-nm wavelength of laser beam. Grooves are formed so that their depth is 15 to 30 nm.

A wobble signal generating circuit 7 (FIG. 2) outputs a wobble signal, WB, which is a sinusoidal signal having a frequency which is synchronous with the rotation of the source disk 2. The wobble signal generating circuit 7 outputs the wobble signal WB while increasing the frequency thereof as the laser position moves from the inner zone (Z0) to the outer zone (Zn). This allows the wobble signal generating circuit 7 to generate a signal which will wobble the laser beam position at 397 cycles per sector, regardless of the radial position of the beam.

In the address area (header area) AR2, a length corresponding to five cycles of groove is allocated. A groove is formed to wobble in 3573 cycles per track of the innermost zone Z0, and grooves are formed to wobble in increments of 397 cycles per sector in general. In this embodiment, 25 bytes of data per cycle are allocated to the user area AR1 and one cycle occupies a length of about 42 µm.

The address signal generating circuit 6, under control of the system control circuit, generates and outputs an address signal SA whose value changes according to the movement of the optical head 4. That is, the address signal generating circuit 6 receives from the spindle motor 3 or the like a timing signal (FG) that is synchronous with the rotation of the source disk 2, and counts the timing signal with a predetermined counter. With the counter information, the address signal generating circuit 6 generates address data corresponding to the laser beam irradiation position as shown in FIG. 3 (FIG. 3(A), (C1), and (C2)). The numbers shown in FIG. 3 indicate the number of bytes of individual data.

The address data is identified by an address data ID. A sector mark SM, timing data VFOs for synchronization, address marks AMs, and post amble PA are added to the address data ID, and the address signal generating circuit 6 generates a sector header to be allocated to each of the first half and the second half of address area AR2 (FIG. 3(B), (C1), and (C2)). The address signal generating circuit 6 forms each sector header with 62 bytes. (Up to 8K bytes of data may be recorded in the address area AR2.) The sector mark SM is allocated 4 bytes to indicate the beginning of a sector header. Timing data VFOs for synchronization, used to lock a PLL circuit in an optical disk recorder/reproducer, are allocated 26 bytes and 16 bytes respectively from the beginning of the header.

Address mark AM is a one-byte address synchronizing signal. Address data ID consists of 6 bytes, two of which contain an error detection code. Two identical address data IDs are repeatedly recorded to increase reliability. Post amble PA (1 byte) is placed to set the polarity of signal.

The address signal generating circuit 6 converts a sector header thus generated into a serial data train and modulates it in a predetermined format. The modulated signal is output as address signal SA corresponding to the scan position of the laser beam L.

A synthesizing circuit 8 uses the wobble signal WB and the address signal SA to generate a drive signal SD, the drive signal including a shift signal for shifting the position of the optical head 4 and a light quantity control signal for controlling the light quantity emanating from the laser beam. The drive signal SD is passed to the drive circuit 5.

Accordingly, optical disks produced from the source disk 2 are preformatted so that the information recording surface is concentrically split and the number of sectors increases in order from the inner zones to outer zones. The address area AR2 is formed in the beginning of each sector, the address of a following groove sector and the address of a following land sector are recorded in the address area AR2, and required data is recorded in the following user area AR1.

In this embodiment, the user area AR1 (FIG. 3B) includes a 24-byte guard area following an 8-byte gap, a 25-byte VFO, a 2-byte synchronous area, a 9672-byte user data area, a 1-byte post amble (PA), a 52-byte guard area, and a 16-byte buffer.

The gap area is provided to facilitate switching between a land and a groove and switching laser beam light quantity, and the guard area is allocated to suppress the fluidity of the recording medium caused by overwrite and to improve the overwrite cycle of the recording area when phase change media are used as the recording media. The synchronous byte is placed to lock a PLL circuit in an optical disk recorder/reproducer, the post amble is placed to set polarity, and the buffer is a redundant area for eliminating jitter due to eccentricity or the like.

FIG. 4 is a perspective view showing an optical disk produced from the source disk 2 and a sectional view of a groove. The optical disk has a thickness of 1.2 mm. In the case of a phase change optical disk, the disk includes the following ordered layers: an aluminum film, a ZnS—SiO2 film, a GeSbTe film, and a ZnS—SiO2 film to produce an information recording surface. In the case of a magneto-optical disk, the disk includes the following ordered layers: an aluminum film, an SiN film, a TbFeCo film, and an SiN film to produce an information recording surface. In the case of a write-once optical disk, the disk includes the following ordered layers: an aluminum or gold sputter film and an organic pigment film to produce an information recording surface.

Further, superimposed on the information recording surface is a light transmission surface of about 0.1 mm thickness, through which the laser beam is transmitted and directed to the information recording surface. Using an optical disk according to this embodiment, the effects of light skew can be minimized and therefore when the disk is exposed to a laser beam of an optical system with a high numerical aperture, correct recording and reproducing of data on the information recording surface can be realized.

The optical disk is formed having a radius of 60 mm with the area located between the radii of 24 mm and 58 mm being allocated for recording.

Further, the optical disk is housed in a cartridge formed so as to be capable of identifying the type of optical disk. The disk and cartridge can be integrally loaded into an optical disk apparatus, thereby reducing interference due to dust or the like during access by the optical system with high numerical aperture.

With these arrangements, phase change optical disks are formed so that data can be recorded in such a way that the crystal structure of the information recording surface is locally changed through exposure to a laser beam, and so that recorded data can be reproduced by detecting a change in the quantity of reflected light.

Magneto-optical disks are formed so that data can be thermomagnetically recorded by applying a magnetic field at a laser beam irradiation position, and so that data recorded through the Kerr effect can be reproduced by detecting the polarized surface of reflected light. Further, write-once optical disks are formed so that data can be recorded in such a way that the information recording surface is irreversibly altered by exposure to a laser beam, and so that recorded data can be reproduced by detecting a change in the quantity of reflected light.

As mentioned above, the source disk 2 is rotationally driven at a constant angular velocity regardless of the radial position of the beam, the frequency of the wobble signal is varied according to the radial position, and grooves are formed according to the wobble signal. As a result, the wobbling cycle of the grooves is constant relative to their radial position.

Figure 5:
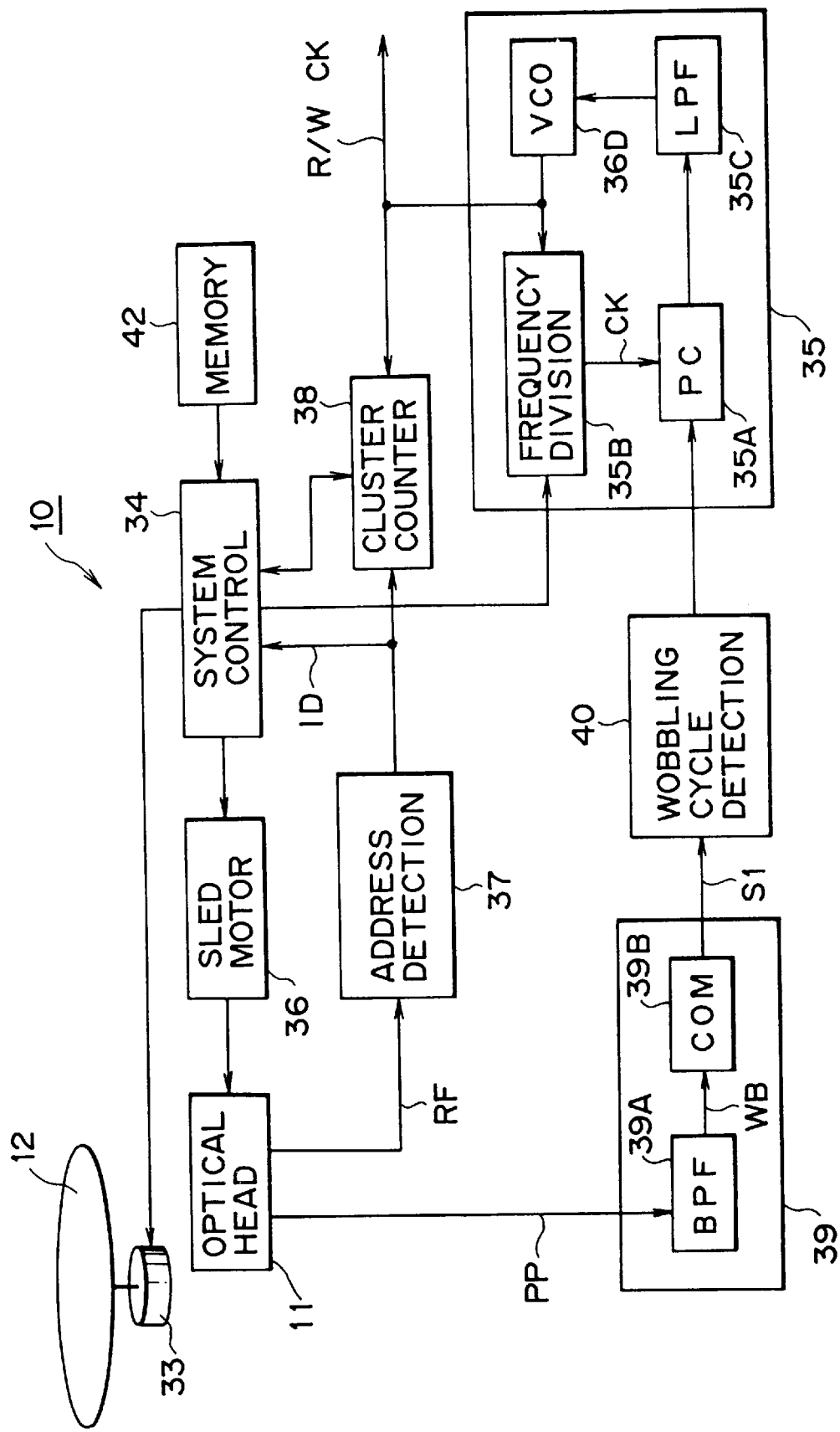
FIG. 5 is a block diagram showing an optical disk apparatus for accessing an optical disk produced by the mastering apparatus in FIG. 1.

FIG. 5 is a block diagram depicting the wobble signal processing system of an optical disk apparatus according to the invention. In the optical disk apparatus 10, a laser beam is irradiated from an optical head 11 onto an optical disk 12 and the light reflected from the disk is detected.

Figure 6:
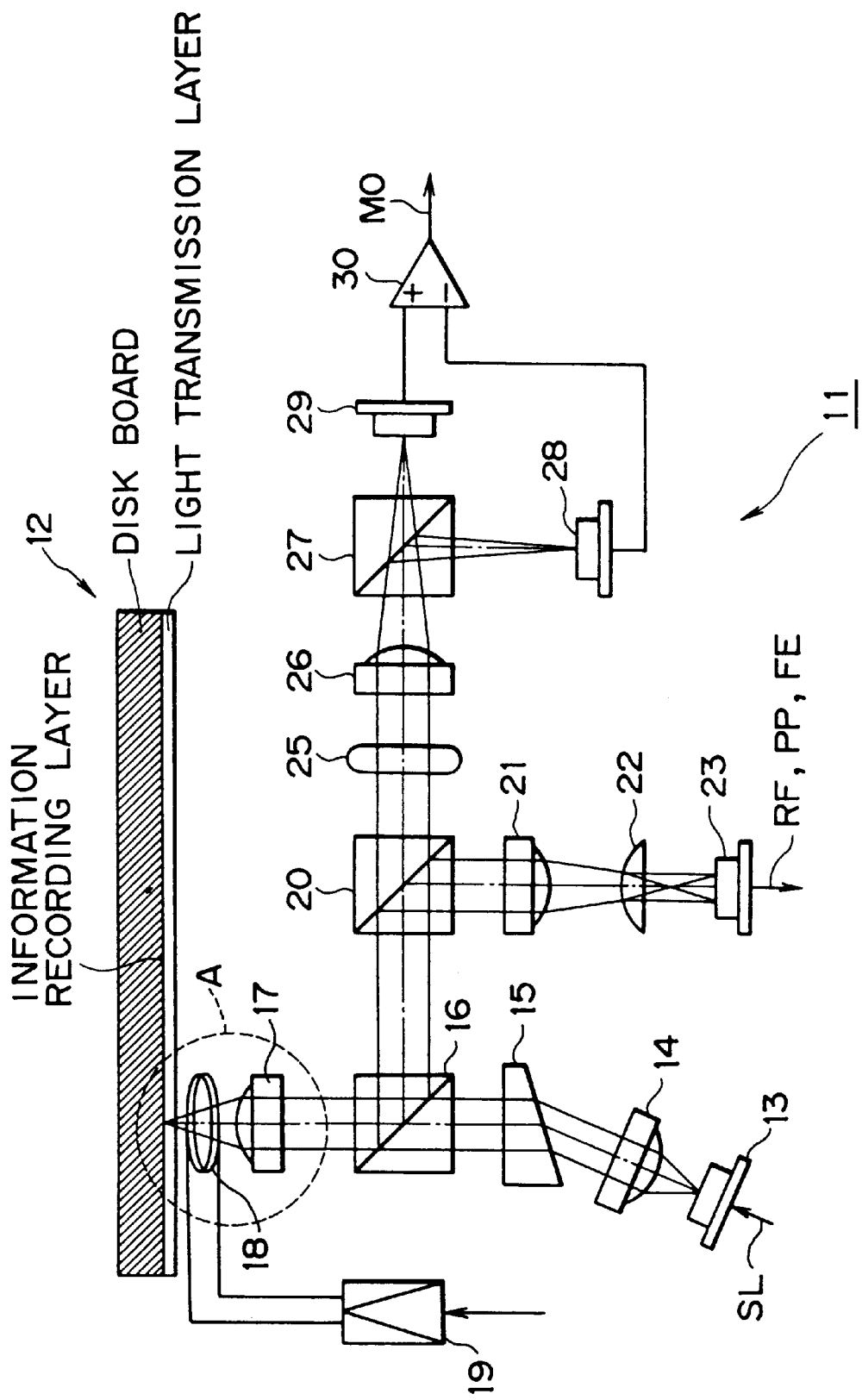
FIG. 6 is a schematic diagram showing the optical head of the optical disk apparatus in FIG. 5.

As shown in FIG. 6, in the optical head 11, semiconductor laser 13 is driven by drive signal SL and irradiates a laser beam of 650 nm in wavelength. During reproduction, the quantity of light irradiated by the semiconductor laser 13 is constant. On the other hand, during recording, the quantity of light irradiated is increased intermittently so as to form the pits (or "marks") required for recording information on optical disk 12.

A collimator lens 14 converts the laser beam emitted from the semiconductor laser 13 into a parallel light beam and a shaping lens 15 corrects the astigmatism of the beam. The beam then passes through a beam splitter 16 and objective lens 17.

The objective lens 17 directs the laser beam onto the information recording surface of the optical disk 12 and directs reflected light toward beam splitter 16. When reproducing, the optical disk apparatus 10 is adapted to reproduce data recorded on optical disk 12 in response to changes in the quantity of the reflected light. When the optical disk 12 is a phase change optical disk, the optical disk apparatus 10 is adapted for recording data by changing the crystal structure of the disk at the position of the impinging laser beam, and data thus recorded can be reproduced in response to changes in the quantity of reflected light.

Further, when the optical disk 12 is a write-once optical disk, the optical disk apparatus 10 is adapted to record data by irreversibly altering the surface of the disk at the laser beam positions. As before, data can be reproduced in response to changes in the quantity of reflected light.

On the other hand, when the optical disk 12 is a magneto-optical disk, the optical disk apparatus 10 is adapted so that data can be recorded through application of a thermomagnetic recording method. More specifically, data can be recorded by driving modulating coils 18 disposed close to the objective lens 17 through a drive circuit 19, a modulated magnetic field can be applied to the laser beam irradiation position. Data can be reproduced by detecting a change in the polarized surface of a reflected light.

In the configuration of FIG. 6, the beam splitter 16 allows a laser beam from shaping lens 15 to travel to the objective lens 17, while it reflects light from objective lens 17 to a beam splitter 20.

The beam splitter 20 allows some of the reflected light to pass and reflects the other remaining light to a lens 21, thereby separating the reflected light into two light beams.

Lens 21 converges light received from splitter 20 and directs the converged beam to a cylindrical lens 22, which applies astigmatism to the converged beam. A photodetector 23 receives the light emitted from the cylindrical lens 22.

The photodetector 23, the light-receptive surface of which is split into predetermined light receptive surfaces, is adapted to be capable of outputting a light reception result for each light-receptive surface. The photodetector 23 subjects the light reception result of each light-receptive surface to current-voltage conversion by a current-voltage conversion circuit (not shown), and then performs addition/subtraction operations by a matrix circuit. Thereby, photodetector 23 detects a reproduction signal RF whose signal level changes according to the quantity of reflected light, a push-pull signal PP whose signal level changes according to a shift of laser beam irradiation position for a groove or pit train, or a focus error signal FE whose signal level changes according to a defocus quantity.

Reflected light passing through the beam splitter 20 is passed to a half-wave plate 25 which changes the polarization of the light so that it can be correctly separated by a polarized beam splitter 27 (described below). A lens 26 converts the light emitted from the half-wave plate 25 into a converged beam. The polarized beam splitter 27 receives the converged beam, and reflects predetermined polarized components of the beam and allows the rest to pass, thereby separating the incoming beam into two beams whose relative light quantity changes according to the polarization of the incoming beam.

Photodetectors 28 and 29 respectively receive the two light beams generated by the polarized beam splitter 27 and each outputs a light reception results which changes according to the quantity of received light. A differential amplifier 30 receives the light reception results of the two photodetectors 28 and 29 via the current-voltage conversion circuit and generates the differential amplification result, thereby outputting a reproduction signal MO whose signal level changes according to the polarization of the light incident on splitter 27.

With these arrangements, the optical head 11 is adapted to record data on a variety of optical disks 12 and to reproduce the recorded data therefrom.

Figure 7:
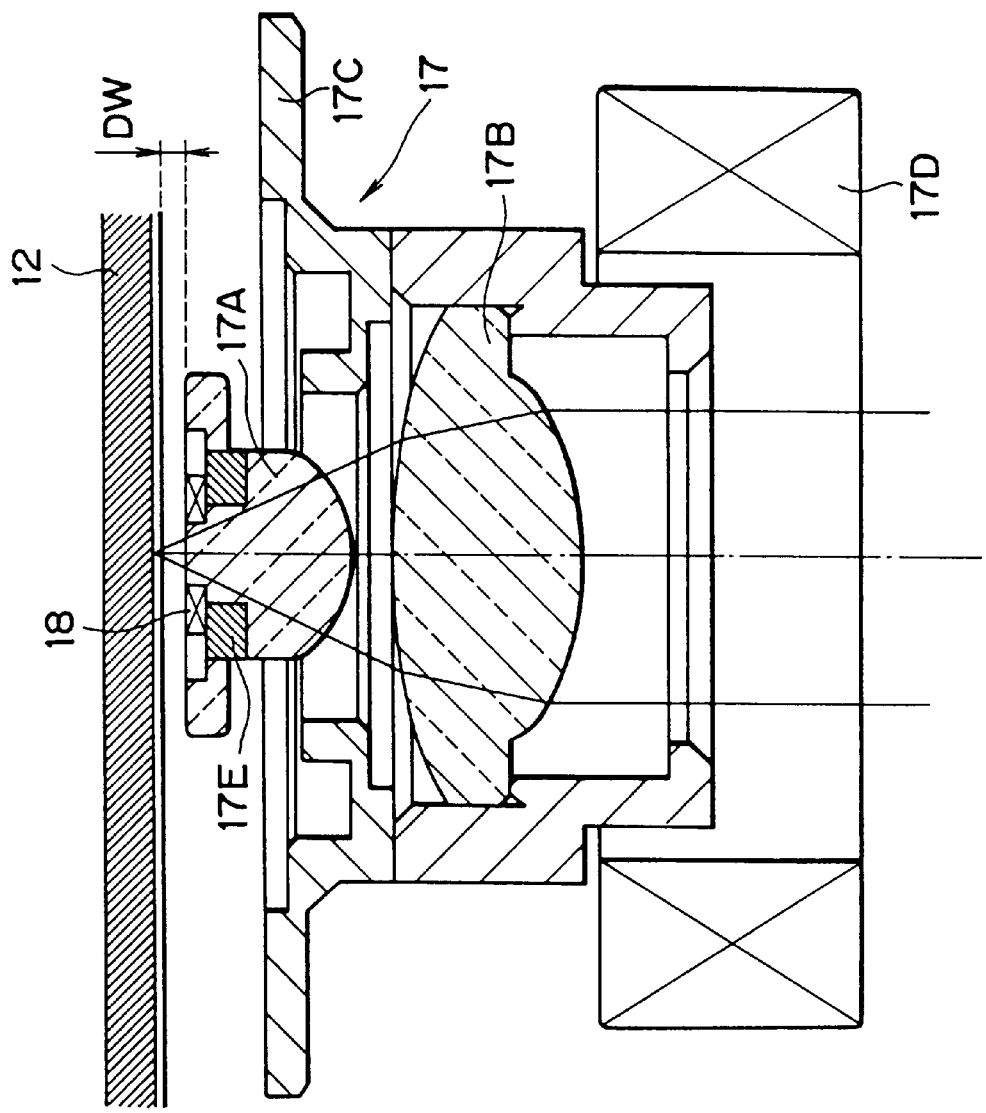
FIG. 7 is a schematic diagram showing the configuration of an objective lens of the optical head in FIG. 6.

FIG. 7 is a sectional view showing a configuration of the objective lens 17 of the optical head 11. The objective lens 17 comprises a first lens 17A and a second lens 17B. The first lens 17A and second lens 17B, both being formed as aspheric plastic lenses, are integrally supported by holding member 17C, and may be moved both perpendicular and parallel to the disk by a drive actuator 17D. In this manner, the optical disk apparatus 10 can carry out tracking control and focus control by integrally moving the first lens 17A and second lens 17B.

Further, the second lens 17B at the laser beam incoming side is formed with a relatively large diameter, while the first lens 17A at the optical disk side is formed with a small diameter, and the focal distance of lens 17A, the focal distance of lens 17B, and the space therebetween are defined to set the numerical aperture of the objective lens 17 to about 0.78

For this reason, the objective lens 17 is adapted to satisfy the following relation; wherein: $\lambda$ is the wavelength of the laser beam, NA is the numerical aperture of the objective lens 17, t is the thickness of the light transmission layer of the optical disk 12, and $\Delta t$ is the dispersion corresponding to t, and $\theta$ is the skew margin of the optical disk 12.

$$\theta \leq \pm 84.115 \times (\lambda/NA^3/t) \tag{2}$$

$$\Delta t \leq \pm 5.26 \times \lambda/NA^4 [\mu m] \tag{3}$$

The expression (2) shows the relationship between a skew margin $\theta$ ensuring stable access to an optical disk and the optical system (Japanese Unexamined Patent Publication 3-225650). Presently mass-manufactured compact disks whose skew margin $\theta$ is about 0.6 degrees are commercially available. In DVD, skew margin $\theta$ is about 0.4 degrees. According to this embodiment, even though the thickness of the light transmission layer of optical disk 12 is about 0.1 mm and the numerical aperture NA of the optical system is about 0.78, practically stable access can be made to the optical disk 12.

The expression (3) shows the dispersion of the light transmission layer (thickness "t") permissible for the optical system. The constant 0.526 is a value calculated with respect to the compact disk, and $\Delta t$ is $\pm 100$ $\mu m$ for a compact disk and $\pm 30$ $\mu m$ for DVD. For this reason, the optical disk apparatus 10 can gain stable access to the optical disk 12 regardless of the dispersion of the thickness t of the light transmission layer.

By irradiating with a laser beam having a wavelength of 650 nm via the optical system with a numerical aperture of 0.78, the optical head 11 is adapted to satisfy the following expression.

$$\text{Capacity} \approx 4.7 \times [0.65/0.60 \times NA/\lambda]^2 \tag{4}$$

The number 4.7 is the recording capacity [GB] of DVD, and the numbers 0.65 and 0.6 are the wavelength of laser beam in DVD and the numerical aperture of the DVD optical system, respectively. Accordingly, the optical head 11 is adapted for a recording capacity of about 8 GB when data processing is performed in the same manner as that of DVD.

In the objective lens 17 thus formed, the first lens 17A is supported in protrusion toward the optical disk 12, thereby providing the working distance DW required by the numerical aperture. The working distance DW is set to about 560 $\mu m$ in consideration of the characteristics and placement of the first lens 17A and second lens 17B. Further, the optical head 11 is constructed so that eccentricity tolerance (between the lens faces of the objective lens 17), the face angle tolerance, and lens curvature are set in a range which is easily achieved in mass production. The head is designed to be compact, and to avoid collision with an optical disk.

If the numerical aperture is increased for a given beam diameter, the objective lens must be positioned closer to the information recording surface of the disk. Accordingly, sufficient space between the head and disk, the beam diameter would have to be significantly increased. However, a practical upper limit on the beam diameter is about 4.5 mm, almost equal to that used in DVD.

On the other hand, to position an optical head close to an optical disk and reduce the beam diameter requires a high degree of precision in objective lens fabrication and positioning. Otherwise, the optical head may collide with the disk. In view of the above considerations, the working distance DW in this embodiment is set to about 560 $\mu$m.

Further, the lens face of the first lens 17A toward the optical disk 12 is flattened, thereby ensuring focus control and preventing collision with the surface of the light transmission layer if the optical disk is skewed.

The diameter of objective lens 17 is decreased in stages as the distance to the disk decreases, and the diameter of the lens which faces the optical disk 12 is made small enough to effectively direct a laser beam onto the disk 12.

Modulating coils 18 are positioned so that they surround the tip of the first lens 17A and as close to the optical disk 12 as possible—so long as they do not protrude from the lens face of first lens 17A. Noting that the disk is almost parallel with the face of lens 17A, the coils are capable of efficiently applying a modulated magnetic field to the laser beam irradiation position.

A rise in the temperature of the modulating coils 18 is suppressed by radiation plates 17E positioned to surround the first lens 17A such that various characteristic changes due to temperature rise can be restricted to a practical range.

In the optical disk apparatus (FIG. 5), the spindle motor 33 rotationally drives the optical disk under control of a system control circuit 34. In one implementation, the spindle motor 33 rotationally drives the optical disk 12 by the so-called ZCLV (Zone Constant Linear Velocity) method so that a read/write clock (R/W CK) generated in PLL circuit 35 becomes a constant frequency. (Zoning in relation to the ZCLV described here corresponds to zoning as explained with respect to FIG. 1.)

A sled motor 36 moves the optical head 11 radially with respect to the optical disk 12 under control of the system control circuit. In this way, the optical disk apparatus can carry out a seek operation.

An address detection circuit 37 receives a reproduction signal RF whose signal level changes according to the quantity of reflected light detected by the optical head 11, and binary-codes the reproduction signal RF. The address detection circuit 37 further detects an address data ID with reference to a synchronizing signal assigned to a sector header from the binary-coded signal and outputs it to the system control circuit 34. The detected timing is passed to a cluster counter 38. Accordingly, the optical disk apparatus 10 can locate the laser beam irradiation position based on the address data ID preformatted in the optical disk 12 and passed to the system control circuit 34, and can check sector timing in the cluster counter 38.

Further, the address detection circuit 37, when outputting the address data ID, performs error detection processing through an error detection code assigned to each address data ID, and selectively outputs an address ID determined as valid.

A wobble signal detection circuit 39 delivers a push-pull signal PP outputted from the optical head 11 to a band-pass filter 39A, which extracts a wobble signal WB. The wobble signal detection circuit 39 binary-codes the wobble signal WB with reference to 0 level in a comparator (COM) 39B, thereby extracting the edge information of the wobble signal WB.

A wobbling cycle detection circuit 40 receives the binary coded signal S1 and determines the wobbling cycle from the edge frequency (as determined from the edge information). The wobbling cycle detection circuit 40 outputs edge information to the PLL circuit 35 when it is determined that the wobbling cycle corresponding to that edge information is correct. In this way, the wobbling cycle detection circuit 40 prevents clock errors caused by dust or the like deposited on the optical disk 12.

The PLL circuit 35 delivers a binary-coded signal outputted from the wobbling cycle detection circuit 40 to a phase comparator (PC) 35A, which compares it with the clock CK outputted from a frequency dividing circuit 35B. The divisor used by the frequency dividing circuit 35B is set according to the setting of the system control circuit 34. The frequency dividing circuit outputs a proper clock CK.

The PLL circuit 35, by means of a low pass filter (LPF) 35C, extracts a low frequency component from a phase comparison result outputted from the phase comparator 35A and controls the oscillation frequency of a voltage control type oscillating circuit (VCO) 36D by the low frequency component. Further, the oscillation output of the voltage control type oscillating circuit 36D is frequency-divided by the frequency dividing circuit 35B, thereby generating a high precision clock CK.

In the PLL circuit 35, the frequency dividing circuit 35B is set by the system control circuit 34 so that the divisor increases as laser beam irradiation position shifts toward the outermost circumference of the optical disk 12. With this arrangement, as the laser beam irradiation position shifts toward the outermost circumference of the optical disk 12, the frequency of oscillation output by the voltage control type oscillating circuit 36D increases. In addition, the VCO output is used as a read/write clock R/W CK.

In the optical disk apparatus 10, the optical disk 12 is rotationally driven by the spindle motor so as to keep the read/write clock R/W CK at a constant frequency, and data is recorded based on the read/write clock R/W CK, the recording density is adjusted so as to prevent any significant difference of linear recording density between inner and outer circumferences.

Cluster counter 38 counts the read/write clock R/W CK cycles based on the detection result of the address detection circuit 37, thereby allowing for highly accurate location of the laser beam irradiation position. Further, the cluster counter 38 outputs a cluster start pulse to the system control circuit 34 based on the count result. The cluster referred to here is a unit of recording/reproducing data for the optical disk 12, and a cluster start pulse is a pulse indicating the start time of a cluster.

When a sector start timing is not detected by the address detection circuit 37 due to dust or the like on the disk surface, the system can interpolate a cluster start pulse by synchronous processing based on the result of counting the read/write clock R/W CK.

The system control circuit 34, which may be a computer controlling the overall operation of the optical disk apparatus 10, for example, controls the operation of the sled motor and other components using address data IDs, the laser beam irradiation position, and control signals from external equipment.

One of the processes carried out by the system control circuit 34 is to switch the divisor used by the frequency dividing circuit 35B in response to the laser beam irradiation position. The various divisors that may be used can be stored in the memory 42.

With this arrangement, the system control circuit 34 decreases the rotation speed of the optical disk in stages from the innermost zone to the outermost zone, correspondingly to the zones Z0, Z1 . . . Zn−1, Zn described in FIG. 1, thereby setting the sectors on the inner and outer zones to an equal recording density.

By performing write/read control according to a cluster start pulse outputted from the cluster counter 38, data of one cluster is assigned to four successive sectors, relative to address area AR2 allocated in each sector. In this way, the system control circuit 34 increases the number of clusters assigned to zones in order from the innermost zone to the outermost zone.

Further, the system control circuit 34 commands a tracking servo circuit (not shown) to move the objective lens 17 in response to the polarity of a tracking error signal, and to switch the laser beam scanning position between grooves and lands. This enables the optical disk apparatus 10 to perform the so-called land/groove recording.

Figure 8:
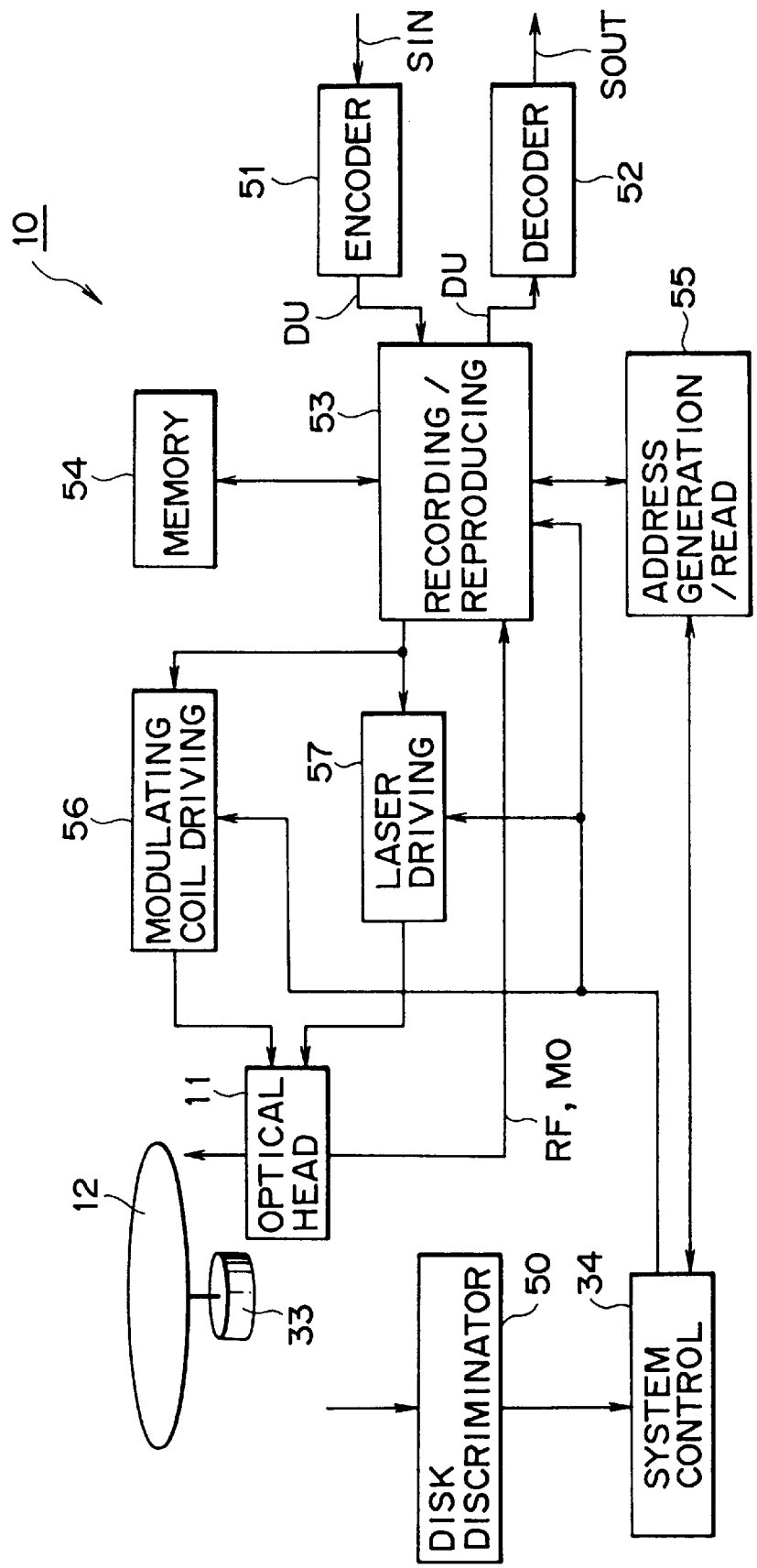
FIG. 8 is a block diagram showing a data processing system of the optical disk apparatus in FIG. 5.

FIG. 8 is a block diagram showing a recording/reproducing system of the optical disk apparatus 10. In the optical disk apparatus 10, a disk discriminator 50 discriminates the type of optical disk 12 by detecting a depression formed in the disk cartridge, for example, and outputs a discriminating signal to the system control circuit 34. Accordingly, different types of disks can be accessed by switching the operation of the recording/reproducing system in response to the type of loaded optical disk 12.

An encoder 51 receives an input signal SIN which includes a video signal and an audio signal (e.g., from external equipment during recording or editing). The encoder subjects the video signal and audio signal to analog-digital conversion processing, and then compresses the data according to the MPEG (Moving Picture Experts Group) standard in order to generate user data DU.

During reproducing or editing, a decoder 52 expands the user data DU outputted from a recording/reproducing circuit 53 according to the MPEG standard in order to generate digital video and digital audio signals, and converts the digital signals into analog signals SOUT.

The recording/reproducing circuit 53 accumulates user data DU outputted from the encoder 51 during recording or editing, processes it in predetermined block units, and records it on the optical disk 12.

Figure 9:
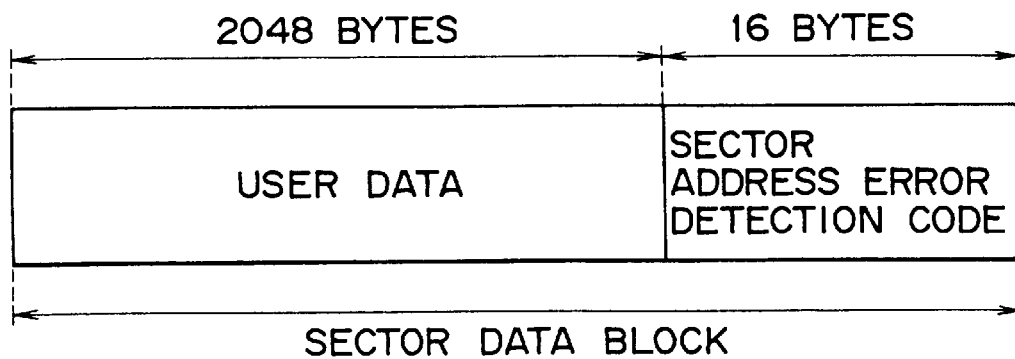
FIG. 9 is a drawing used for explanation of sector structure in the optical disk as employed in the apparatus of FIG. 8.

As shown in FIG. 9, the recording/reproducing circuit 53 successively divides the user data DU into blocks of 2048 bytes each and adds 16-byte address data and error detection code to each block. The recording/reproducing circuit 53 forms a sector data block with 2048 plus 16 bytes. Address data contains the address of the sector data block. Sectors containing the user data DU are different from the preformatted sectors described above with respect to FIG. 1. An error detection code is generated for the address data.

Figure 10:
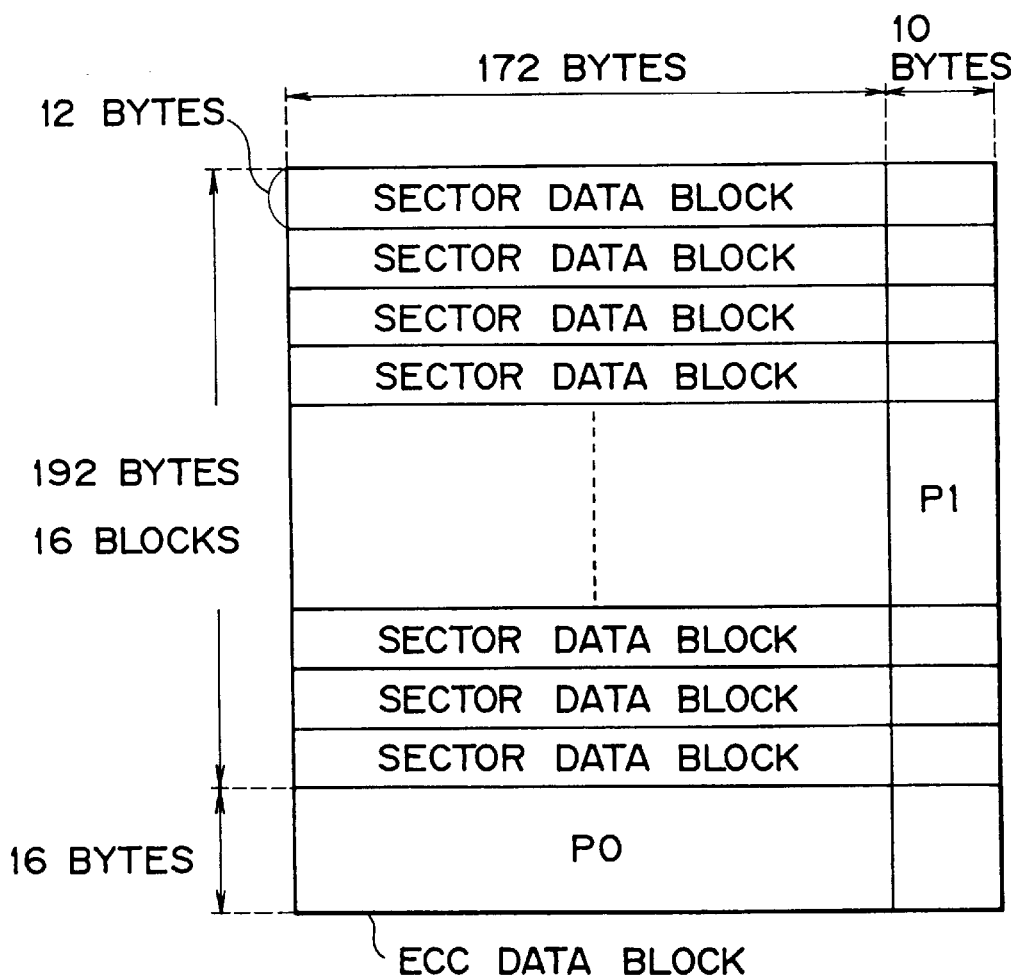
FIG. 10 is a drawing showing an ECC block in the optical disk as employed in the apparatus of FIG. 8.

As shown in FIG. 10, the recording/reproducing circuit 53 forms an ECC data block (182 bytes×208 bytes) with 16 sector data blocks. That is, the recording/reproducing circuit 53, as shown in the figure, successively arranges the 16 sector data blocks of 2048+16 bytes in the order of raster scanning in units of 172 bytes, and generates an inner error correction code (PI) in the horizontal direction and an outer error correction code (PO) in the vertical direction.

Figure 11:
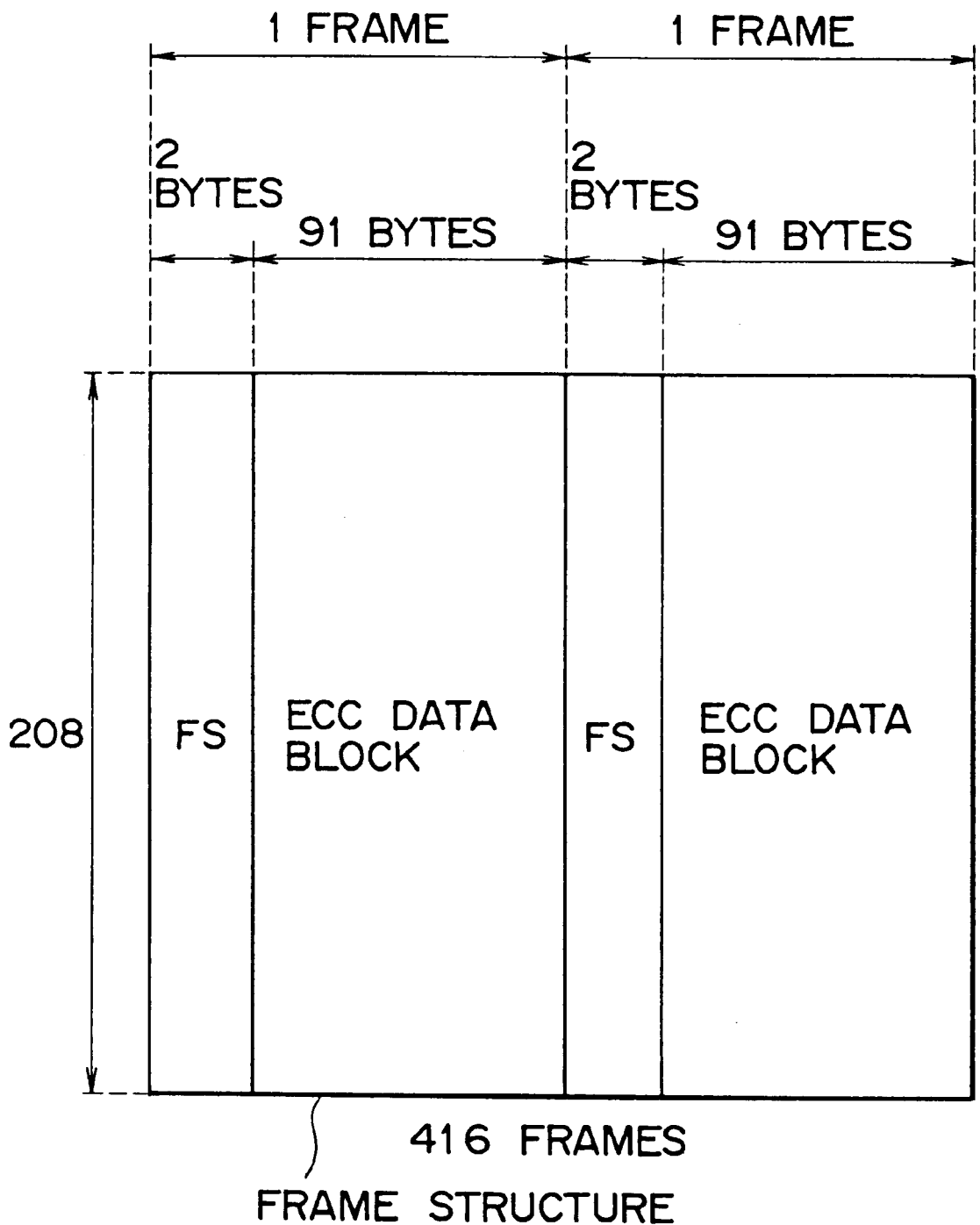
FIG. 11 is a drawing used for explanation of frame structure in the optical disk as employed in the apparatus of FIG. 8.

The recording/reproducing circuit 53 subjects the ECC block to interleaving and forms a frame structure shown in FIG. 11. That is, the recording/reproducing circuit 53 assigns a 2-byte frame synchronizing signal (FS) to each 91 bytes of the ECC block of 182×208 bytes, thereby forming 208 frames for one ECC data block. In this way, the recording/reproducing circuit 53 forms one cluster of data according to the frame structure shown in FIG. 11 and assigns the cluster to four successive sectors.

The recording/reproducing circuit 53 assigns predetermined data of fixed value as required, and processes continuous data according to the sector structure described above with respect to FIG. 3. Further, the recording/reproducing circuit 53 subjects data strings to (1, 7) RLL modulation, then outputs a data string after performing an operation on successive bit strings. The data string is outputted at a data transfer rate of 11.08 Mbps, so that it is intermittently output at a transfer rate that is greater than the rate at which user data DU is inputted from the encoder 51. As a result, the recording/reproducing circuit 53 can record continuous user data DU without a pause.

During the data recording, the recording/reproducing circuit 53 outputs data modulated on the basis of the read/write clock R/W CK described above with respect to FIG. 5, and starts to output data modulated on the basis of the timing detected in the cluster counter 38 under control of the system control circuit 34.

Further, after amplifying signals RF and MO inputted from the optical head 11 during reproducing, the recording/reproducing circuit 53 binary-codes them to generate binary-coded signals, and reproduces a clock from the resulting binary-coded signals. The clock thus reproduced corresponds to the read/write clock R/W CK. Further, by successively latching the binary-coded signals on the basis of the reproduced clock, reproduction data is detected.

The recording/reproducing circuit 53 applies the PRML (Partial-Response Maximum-Likelihood) method to decode the reproduction data and generate decoded data. Also, the recording/reproducing circuit 53 subjects the decoded data to deinterleaving and error correction processing prior to passing the data to the decoder 52.

In DVD, data subjected to (1, 7) RLL modulation may be recorded with a bit length of 0.4 $\mu$m. If a recording/reproducing system is formed according to the same margin as that of DVD (on a numerical aperture basis), data can be recorded or reproduced with a bit length of 0.3 $\mu$m and a linear recording density of 0.23 $\mu$m/bit. On the other hand, by actively using intercede interference by PRML, the same margin could be obtained with a linear recording density of 0.23 $\mu$m or less.

At this time, in the same way as during recording, the recording/reproducing circuit 53 intermittently reproduces data from the optical disk 12 in units of clusters at a data transfer rate of 11.08 Mbps and continuously outputs the reproduced user data DU to the decoder 52.

In reproduction processing, the recording/reproducing circuit 53, when the optical disk 12 is a magneto-optical disk, selectively processes the MO signal (level changes according to the polarized surface) under control of the system control circuit 34, and reproduces user data DU. When the optical disk is a reproduction only, write-once, or phase change optical disk, the recording/reproducing circuit 53 selectively processes the RF signal (level changes according to a change in the quantity of reflected light), and reproduces user data DU. When the optical disk 12 is a magneto-optical disk, the recording/reproducing circuit 53 selectively selects the reproduction signal RF and reproduces user data DU when a read-in area at the inner circumferential side is reproduced.

The address read circuit 55, during recording, generates address data to be added to each sector data block (FIG. 9) and outputs it to the recording/reproducing circuit 53, and during reproducing, analyzes address data detected in the recording/reproducing circuit 53 and reports the result to the system control circuit 34.

The modulating coil driving circuit 56, during writing, when the optical disk 12 is a magneto-optical disk, drives the semiconductor laser of the optical head 11 in sync with the read/write clock R/W CK under control of the system control circuit 34, intermittently increasing the light quantity of a laser beam.

The laser driving circuit 57, during writing, when the optical disk 12 is a phase change or write-once disk, intermittently increases the light quantity of the laser beam according to the output data of the recording/reproducing circuit 53, thereby recording user data DU on the optical disk 12.

On the other hand, the laser driving circuit 57 keeps the light quantity of the laser beam at a constant low level during reading.

The modulating coil driving circuit 56, when the optical disk is a magneto-optical disk, starts up recording operation under control of the system control circuit 34 and drives the modulating coil of the optical head 11 according to the output data of the recording/reproducing circuit 53. The modulating coil driving circuit 56 applies a modulated magnetic field to the laser beam irradiation position as the light quantity of the beam intermittently increases, and records user data DU by the thermomagnetic recording method.

Figure 12B:
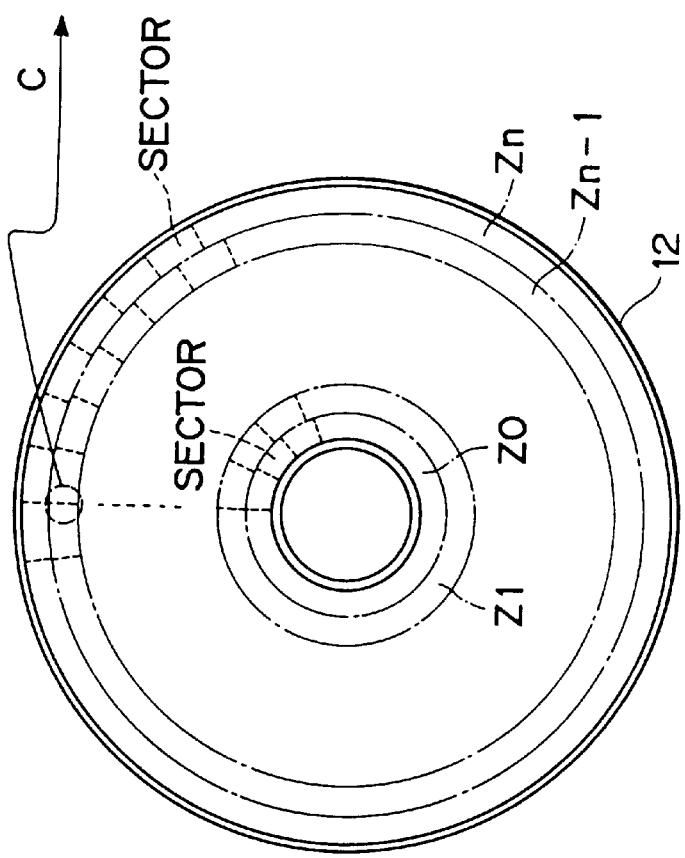
FIG. 12 is a plan view used for explanation of processing of continuous data in the optical disk apparatus in FIG. 8.
Figure 12A:
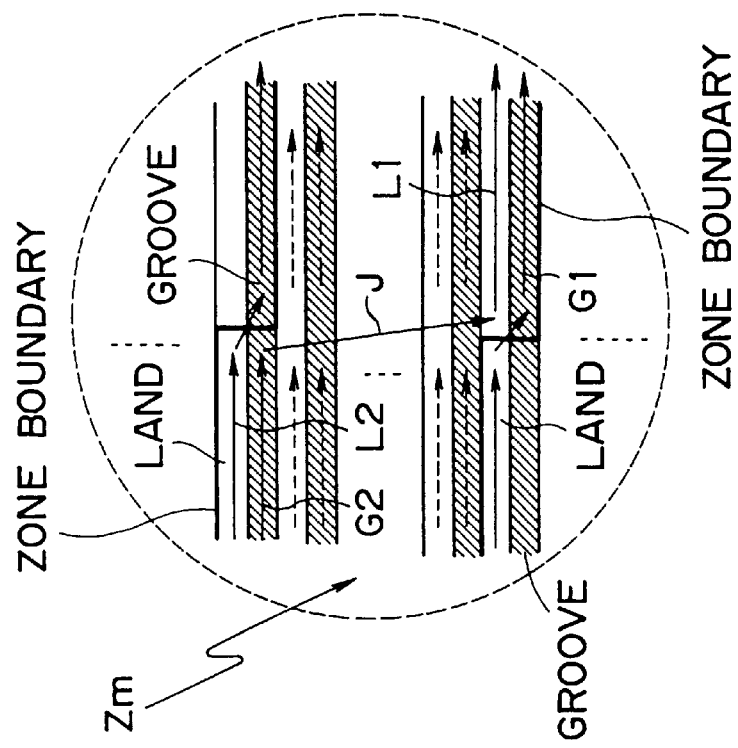

FIG. 12 is a schematic diagram showing access to the optical disk 12 when continuous data is recorded or reproduced under control of the system control circuit 34. The system control circuit 34 switches an access target from inner zones to outer zones based on address data ID detected by the address detection circuit 37, and successively records or reproduces continuous data.

When the system control circuit 34 accesses data in a zone Zm, it controls the overall operation so that, after access is started at the innermost groove of the zone (symbol G1), the groove track is accessed up to the outermost circumference of the zone Zm (symbol G2). Then, the system control circuit 34 issues a track jump command as shown by the symbol J to switch the access target to the land track of the innermost circumference of the zone Zm and controls the overall operation so as to access the land track from the innermost circumference (symbol L1) to the outermost circumference (symbol L2) of the zone Zm.

With this arrangement, the system control circuit 34 drives the optical disk 12 by ZCLV in a manner that records continuous user data DU in a range in which a constant rotation speed is maintained, and records the user data in a following outer area when recording in that range becomes difficult. Accordingly, in the optical disk apparatus 10, the rotation speed of the optical disk 12 is switched with less frequency so that access speed is improved.

The system control circuit 34 first records the user data DU in order from the inner circumferential side to the outer circumferential side with respect to groove tracks in the range in which constant rotation speed is maintained, and at completion of the recording, records the user data DU in order with respect to land tracks, whereby the seek operation of the optical disk 11 is also reduced so that access speed is improved again.

Upon completion of such access to one zone, the system control circuit 34 switches the access target to a following outer zone and starts to record the continued user data DU on a groove track in the outer zone. Thus, the system control circuit 34 controls the overall operation so as to start access from a groove track in each zone.

In the above mentioned configuration, the mastering apparatus (FIG. 2) rotationally drives the source disk 2 and spirally irradiates the laser beam L from the inner circumferential side to the outer circumferential side of the disk, whereby grooves are formed at a space of about 1.0 $\mu$m and the groove shape is formed to wobble by a wobble signal WB.

Further, in the mastering apparatus, the spot shape and light quantity of the laser beam L are set so that the spaces between a groove formed by exposure of the laser beam L and adjacent grooves are almost equal, whereby an optical disk is formed so that land/groove recording can be carried out. In accordance with the invention, land/groove recording is carried out at a linear recording density of about 0.21 $\mu$m/bit, (relative to grooves) so that 8 GB or more of data can be recorded. Accordingly, the mastering apparatus 1 is adapted so that 8 GB or more of data can be recorded on optical disks produced from the source disk 2 by making effective use of the information recording surface.

Zoning is carried out in such a way that the source disk 2 is rotationally driven under the condition of constant angular velocity and the laser beam irradiation position is shifted by a wobble signal WB whose frequency increases in stages. Thus, the wobbling cycle, which is based on the basis of the rotation angle of the optical disk, is kept constant between the inner and outer circumferences of each zone.

In the address signal generation circuit 6 of the mastering apparatus 1, an address data ID (FIG. 3(A)) whose value changes for each rotation of the source disk 2 is formed and data to be assigned to the address area AR2 is formed with synchronous data, etc. appended to the address data ID (FIG. 1). The data, after being modulated, is synthesized with the wobbling signal WB in the synthesizing circuit 8, then is outputted to the drive circuit 5. In this way, in the mastering apparatus 2, groove wobbling is stopped at a predetermined angular interval, address data represented by a pit train is recorded on the source disk 2, and sectors each beginning with the address data are formed by spirally splitting the source disk 2 at a predetermined angular interval.

In an optical disk produced from the source disk 2, access to the sectors on the basis of the address data can be correctly made by interpolation processing based on groove wobbling even when address data cannot be correctly reproduced due to dust, etc. Accordingly, information can be recorded, as address data, at high density with low redundancy, so that addresses recorded on the optical disk can be correctly detected by making effective use of the information recording surface.

When a sector structure is formed in this way, the mastering apparatus 1 concentrically zones the source disk 2 by varying the frequency of the wobbling signal WB and forms a pit train so that the number of sectors increases sequentially from inner zones to outer zones. As a result, the information recording surface can be effectively used by gaining access to the optical disk through application of the zone CLV, and access speed can be improved.

The address area AR2 is divided into two areas, which are assigned the address data of a following groove sector and a following land sector, respectively, whereby, even when data is recorded at high density by the land/groove recording, crosstalk from adjacent tracks of address data can be effectively avoided and the address data can be correctly reproduced.

An error detection code is assigned to two bits of an address data ID and identical address data IDs are repeatedly assigned to one area, to provide some redundancy and to reduce the likelihood that address data is incorrectly reproduced.

In the optical disk fabrication process according to this embodiment, an optical disk is produced based on a sector structure formed on the source disk 2 via a predetermined process implemented by the mastering apparatus 1.

The optical disk (FIG. 4) has an information recording layer coated with a light transmission layer of about 0.1 mm, through which the laser beam is transmitted and directed to the information recording layer. This construction allows correct recording/reproducing of data on/from the information recording surface by effectively avoiding degradation due to skew. The optical system which directs the laser beam through the transmission layer has a high numerical aperture The optical disk 12 is subjected to spindle control or other processing in the optical disk apparatus on the basis of the above-mentioned groove wobbling. In addition, the groove wobbling is used in the PLL circuit 35 to generate a highly accurate clock Ck, and the clock is, in turn, used by the cluster counter 35 (FIG. 6) to determine sector timing.

That is, the optical disk 12, in the optical disk apparatus 10 (FIGS. 5 and 6), is irradiated by a laser beam of 650 nm in wavelength via an objective lens having a numerical aperture of about 0.78 at a working distance of about 560 $\mu$m. The light reflected from the disk is received by the optical head 11, and the following signals may be detected: a reproduction signal RF whose signal level changes according to the light quantity of the reflected light, a reproduction signal MO whose signal level changes according to the polarization of the reflected light, a push-pull signal PP whose signal level changes according to a shift of the position of laser beam irradiation onto a groove or pit train, and a focus error signal FE whose signal level changes according to a defocus quantity.

From the push-pull signal PP a wobble signal WB is extracted in the wobble signal detection circuit 39. The wobble signal WB is binary-coded and edge information is extracted. In the PLL circuit 35, a binary-coded signal having the edge information is phase-synchronized with an output signal CK of the frequency dividing circuit 35B and the read/write clock R/W CK is generated.

Since the wobble signal WB is generated by a carrier signal of a single frequency, edge information resulting from the binary-coding operation contains correct phase information. Accordingly, a read/write clock R/W CK having high accuracy is generated by synchronizing phases according to the edge information.

Further, the read/write clock R/W CK is counted by the cluster counter 38 at a frame synchronization timing detected from the address area AR2 in the address detection circuit 37. The information from the cluster counter is used to set the read/write timing in the recording/reproducing circuit 53 (FIG. 8). Since the system is synchronized by highly accurate clock R/W CK, the laser beam irradiation position and write timing can be determined with high accuracy and the information recording surface of the disk can be used to record data at a high density.

Even when it is difficult to correctly detect frame synchronization timing in the address detection circuit 37 due to the influence of dust, etc. correct timing can be detected by counting the clock R/W CK.

When the wobble signal WB is processed in this way, the frequency divisor used in the PLL circuit 35 is varied according to laser beam irradiation position, thereby allowing ZCLV rotation of the disk.

Since the groove wobbling cycle is kept constant, the cycle of the PLL circuit 35 is quickly recovered in each zone and access speed is improved. Also, since the groove wobbling cycle is kept constant, wobbling signal degradation due to cross-talk can be effectively avoided.

In the optical disk apparatus 10 described above (FIG. 8), during recording, video and audio signals are subjected to data compression (e.g., MPEG encoding) in the encoder 51 and are converted into user data DU, which is subjected to modulation processing in predetermined units of ECC blocks. Further, when the optical disk 12 is a magneto-optical disk, recording is carried out by intermittently increasing the beam intensity in synchronism with the read/write clock R/W CK and applying a modulated magnetic field according to the data of the ECC blocks subjected to modulation processing. The modulating coil driving circuit 56 is used to apply the modulated field at the beam irradiation position. In this manner, user data DU is thermomagnetically recorded.

To record when the optical disk 12 is a phase change or write-once optical disk, the quantity of laser beam light is varied by the laser driving circuit 57 in accordance with the data of the ECC block and the read/write clock R/W CK.

In the optical disk apparatus 10, the user data DU of one ECC block is successively allocated to four sectors and recorded. Correct timing can be insured by the highly accurate clock and the use of interpolation. Thus, sectors can be correctly recorded at a high density, on the optical disk 12.

During reproduction, a particular sector is detected in the same way as it is detected during recording. After the reproduction signal RF or MO (obtained from the optical head 11) is binary-coded, a reproduction clock is generated and reproduction data is successively obtained based on the reproduction clock. The reproduction data is decoded and outputted. At this time, it should be noted that the reproduction signal MO obtained from the magneto-optical disk 12 has a smaller SIN ratio in comparison to the reproduction signal RF obtained from a pit train. Furthermore, it is noted that in this embodiment, since the address area AR2 comprising pit trains is spirally formed in each zone, crosstalk from the pit trains to the reproduction signal MO is effectively avoided.

When accessing the optical disk 12 in this way, the optical disk apparatus 10, by the system control circuit 34 performing control based on a sector address obtained from the optical disk 12 (FIG. 12), records continuous user data DU in zone Zm where a constant rotation speed is maintained by ZCLV, and records the user data DU in a following outer zone when recording in the zone Zm becomes difficult. Accordingly, in the optical disk apparatus 10, the rotation speed of the optical disk 12 is switched with less frequency so that access speed is improved.

In the zone Zm in which the constant rotation speed is maintained, user data DU is first recorded in order from the inner circumferential side to the outer circumferential side with respect to groove tracks, and at completion of the recording, the user data DU is recorded in the same manner with respect to land tracks. Accordingly, in the optical disk apparatus 10, the seek operation of the optical disk 11 is also reduced, so that access speed is further improved.

According to the above mentioned configuration, the width of a groove and that of a land are set to be almost equal. Grooves are formed on the disk so that groove tracks and land tracks are alternately formed in a spiral fashion and the track pitch is set to 0.5 $\mu$m. The light transmission layer is set to a thickness of 100 $\mu$m. In the above configuration, information can be recorded at high density to provide an optical disk system having a capacity of 8 GB.

In accordance with the invention, groove tracks and land tracks may be accessed by irradiating a disk with a laser beam from an optical system having a working distance of 560 μm and a numerical aperture of 0.78 or more. The rotation speed of the optical disk is switched in stages from the inner circumferential side to the outer circumferential side of the optical disk, to allow the recording density of the outer circumferential side to be set almost equal to that of the inner circumferential side, and to allow information to be recorded at high density by making effective use of the information recording surface.

Further, by serially accessing groove and land tracks respectively, and accessing the innermost land track following the outermost groove track in a zone in which the rotation speed of the optical disk is kept constant, the rotation speed of the optical disk 12 can be switched with less frequency and the seek and access speeds can be improved.

Figure 13A:
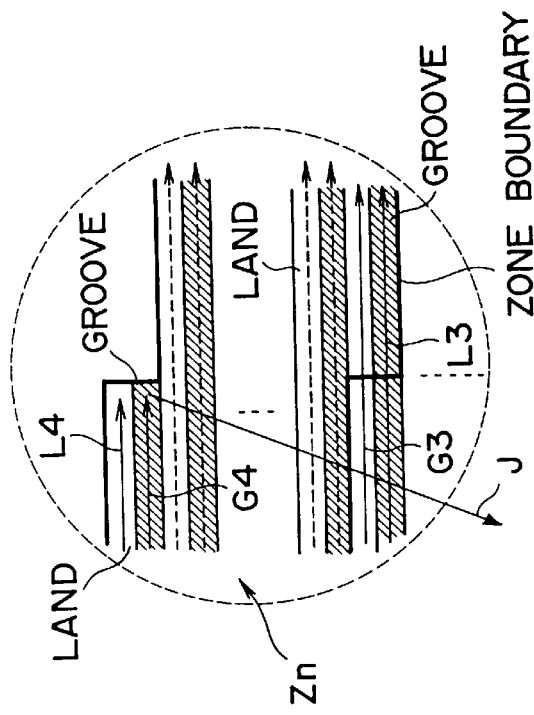
FIG. 13 is a plan view used in comparison with FIG. 12 to explain processing of continuous data in an optical disk apparatus according to a second embodiment of this invention.
Figure 13B:
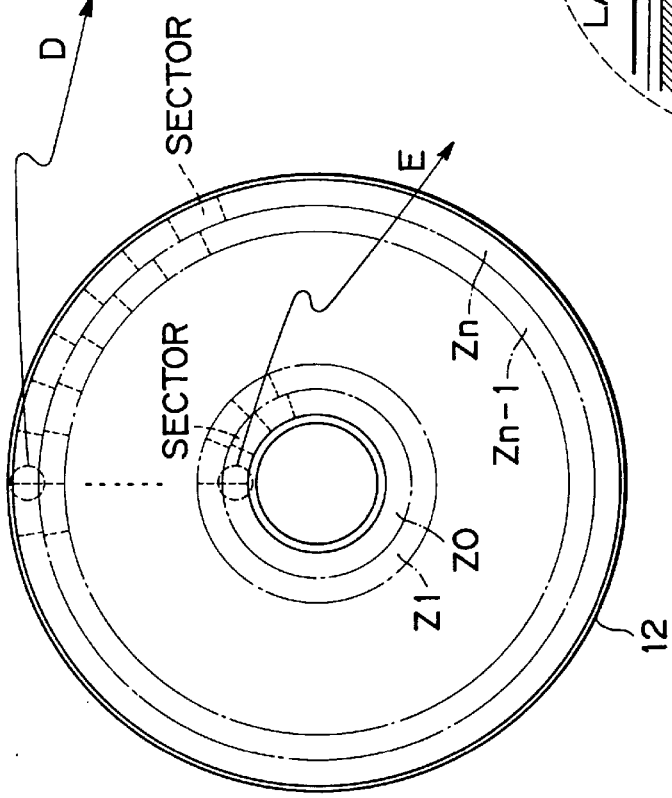
Figure 13C:
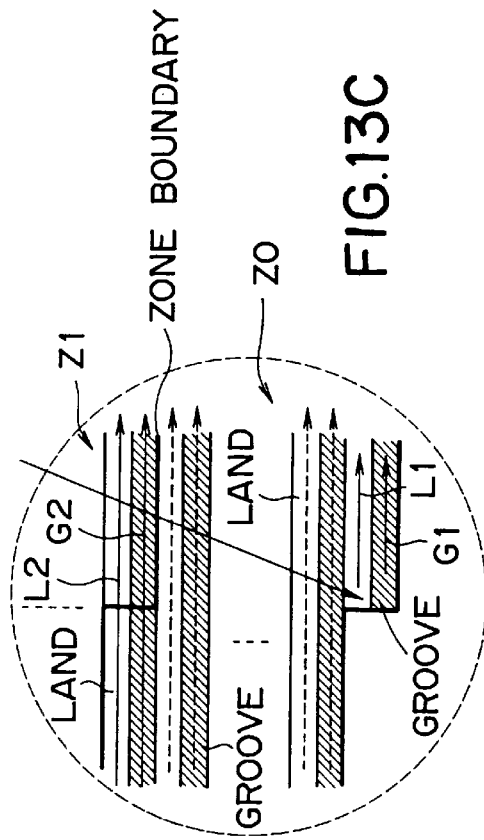

FIG. 13 is a plan view showing access to an optical disk by an optical disk apparatus according to a second embodiment of this invention (in comparison with FIG. 12). In the second embodiment, the optical disk 12 described above with respect to the first embodiment is accessed.

In the second embodiment, an optical disk apparatus accessing the optical disk 12 is configured identically with the optical disk apparatus according to the first embodiment, except that the processing procedure of the system control circuit in accessing the optical disk 12 is different.

That is, according to this embodiment, when no data is recorded on the optical disk 12, the system control circuit, when recording continuous data on the optical disk 12, starts to record the data from the innermost groove track (symbol G1) in the innermost zone Z0 of the optical disk 12.

On completion of data recording on groove tracks in the zone Z0, the system control circuit starts to record the continuous data on groove tracks of a following zone Z1 as shown by the symbol G2, and repeats the data recording on groove tracks up to the outermost zone Zn as shown by the symbols G3 and G4.

On completion of access to the optical disk 12 up to the outermost groove track in the outermost zone Zn, the system control circuit causes a jump to the innermost land track in the innermost zone Z0 (indicated by jump track symbol J), and records the continuous data in order up to the outermost land track of the optical disk, as shown by the symbols L1 to L4.

Thus, in this second embodiment, the system control circuit reduces the track jump frequency with respect to the whole of the optical disk 12.

All of the advantages of the first embodiment can be realized while reducing the track jump frequency with respect to the whole of the optical disk 12.

Figure 14B:
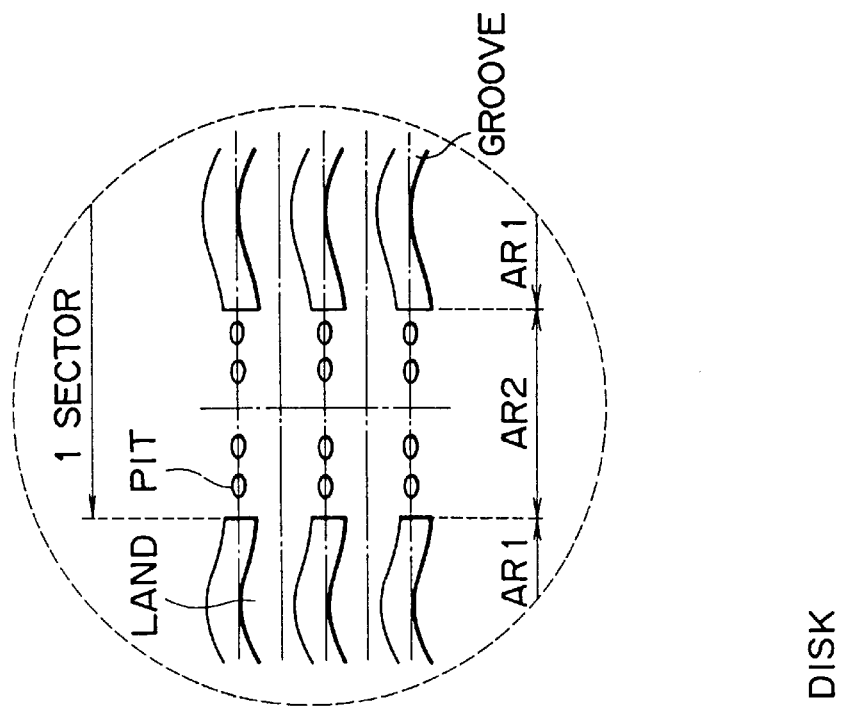
FIG. 14 is a plan view used for explanation of sectors formed by a mastering apparatus according to yet another embodiment of this invention.
Figure 14A:
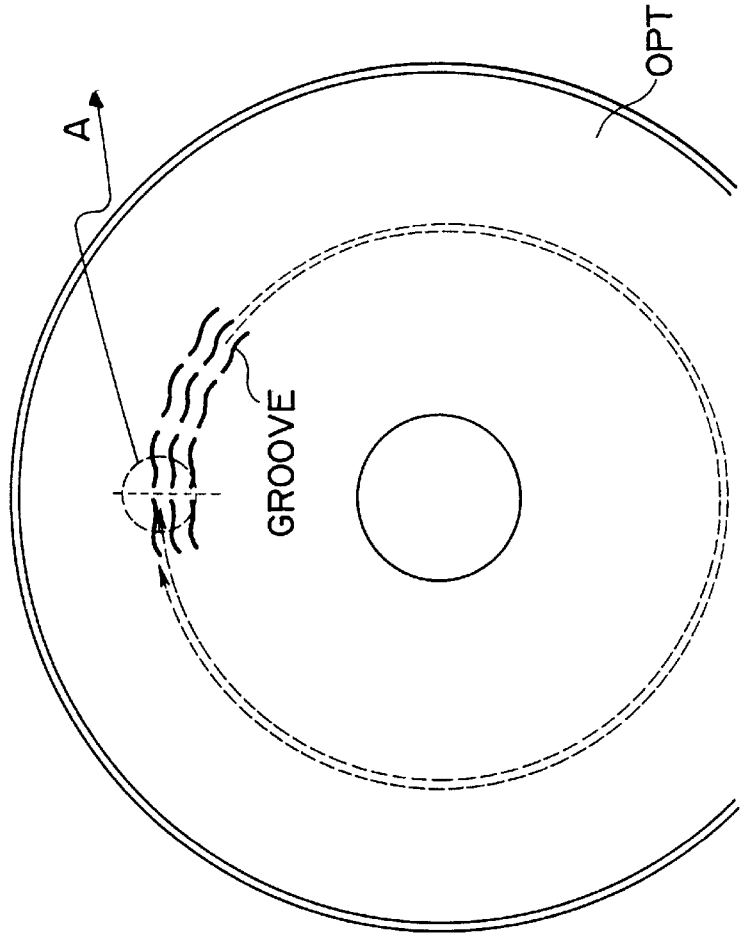

FIG. 14 is a plan view showing an optical disk according to another embodiment of the present invention (in comparison with FIG. 1). In the fabricating process of an optical disk according to this embodiment, like the first embodiment, grooves are formed and the groove formation is stopped at a predetermined angular interval to record address data by a pit train. According to this embodiment, the address data of a following groove sector and the address data of a following land sector are recorded in the first half and second half of address area AR2, respectively, and the pit train is placed on the center of a groove track.

The optical disk apparatus accesses the optical disk in the same way as in the abovementioned embodiments.

All the advantages of the first embodiment may be realized in the configuration shown in FIG. 14.

Figure 15B:
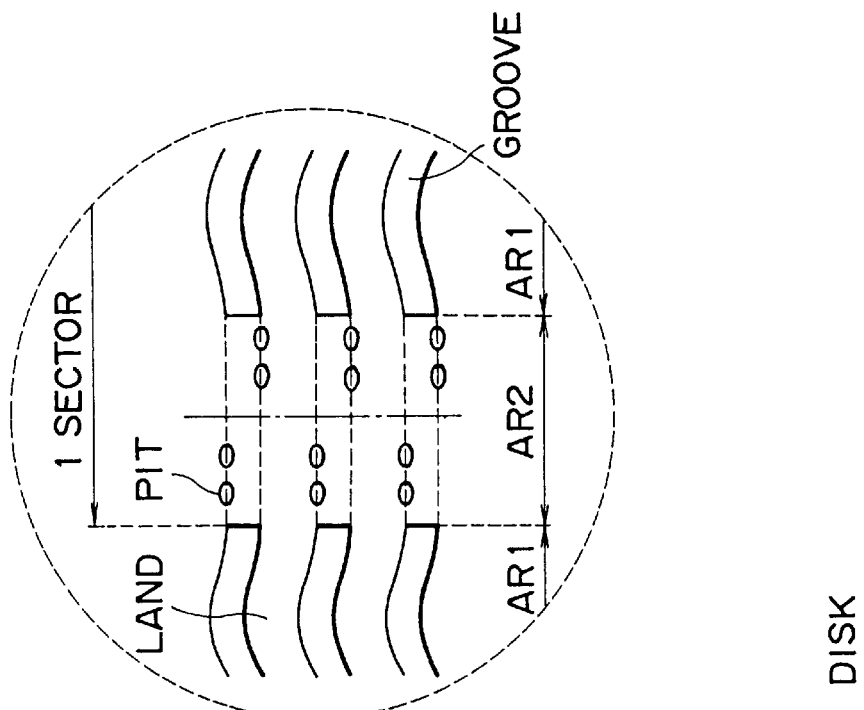
FIG. 15 is a plan view used for explanation of sectors formed by a mastering apparatus according to a still further embodiment of this invention.
Figure 15A:
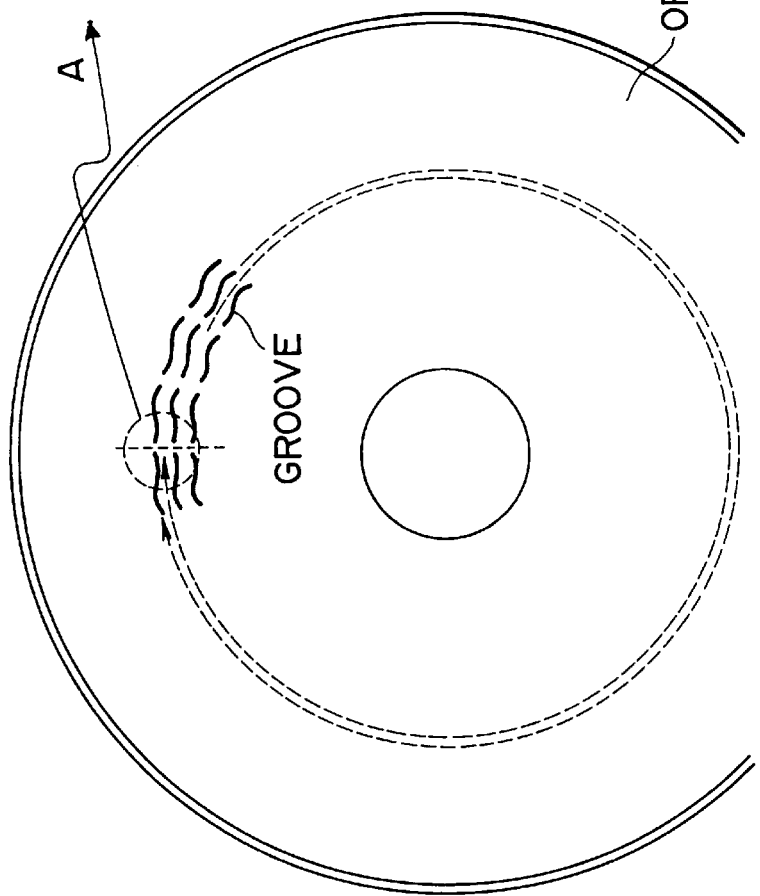

FIG. 15 is a plan view showing an optical disk according to yet another embodiment of the present invention (in comparison with FIG. 1). In the fabricating process of an optical disk according to this embodiment, like the first embodiment, grooves are formed and the groove formation is stopped at a predetermined angular interval to record address data by a pit train. According to this embodiment, the address data of a following groove sector and the address data of a following land sector are recorded in the first half and second half of address area AR2, respectively, and the pit trains in the first and second portions are formed on the boundaries of land and groove, respectively.

The optical disk apparatus accesses the optical disk in the same way as in the above mentioned embodiments.

All of the advantages of the first embodiment may be realized in the configuration shown in FIG. 15.

FIG. 16 is a plan view showing an optical disk according to a still further embodiment of the present invention (in comparison with FIG. 1). In the fabricating process of an optical disk according to this embodiment, tracks with a pitch of 0.5 μm are formed by alternately repeating a groove and a land in a circumferential direction of an optical disk in such a way that one round of a groove is followed by an outer land and one round of the land is followed by an outer groove.

Further, the groove formation is stopped at a predetermined angular interval to record address data by a pit train. At this time, according to this embodiment, the address data of a following groove sector and the address data of a following land sector are recorded on the corresponding track center.

Figure 17B:
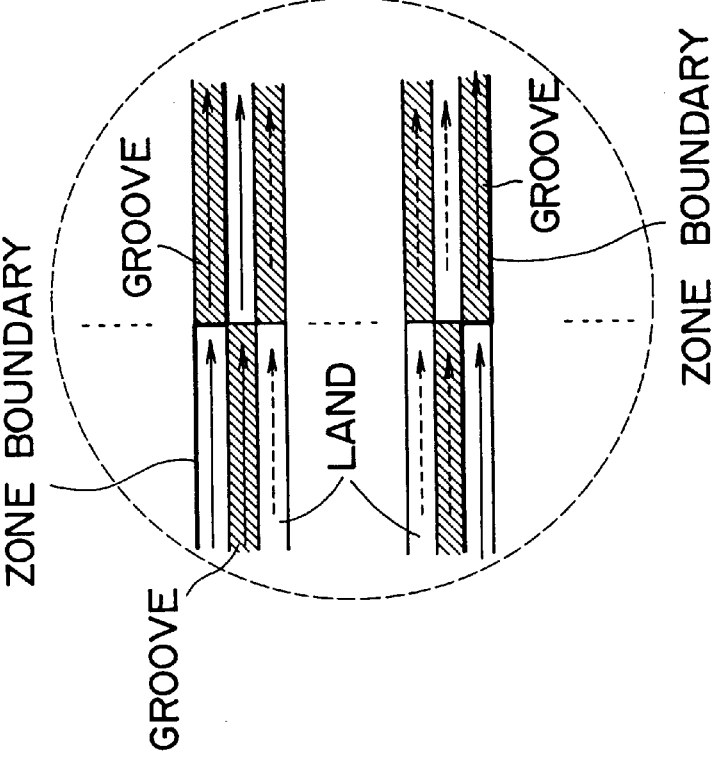
FIG. 17 is a plan view used for explanation of processing of continuous data in the optical disk apparatus applied to the optical disk depicted in FIG. 16.
Figure 17A:
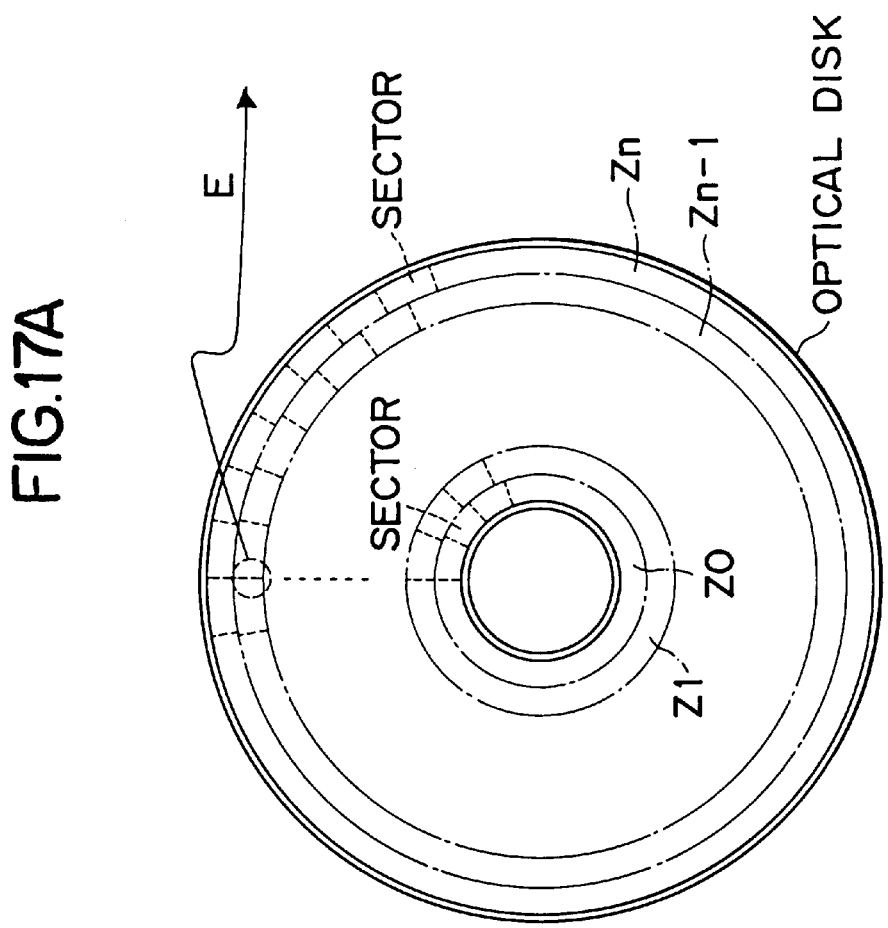

As shown in FIG. 17 in comparison with FIG. 12, in this embodiment, the optical disk apparatus records continuous data by following tracks in order from the inner circumferential side to the outer circumferential side. When recording continuous data, the rotation speed of the optical disk is switched with less frequency and the seek time is reduced.

According to the configuration shown in FIGS. 16 and 17, when tracks with a pitch of 0.5 μm are formed by alternately repeating a groove and a land in a circumferential direction of an optical disk, the advantages of the first embodiment can be realized, while a higher access speed is achieved compared to the first and second embodiments.

Figure 18B:
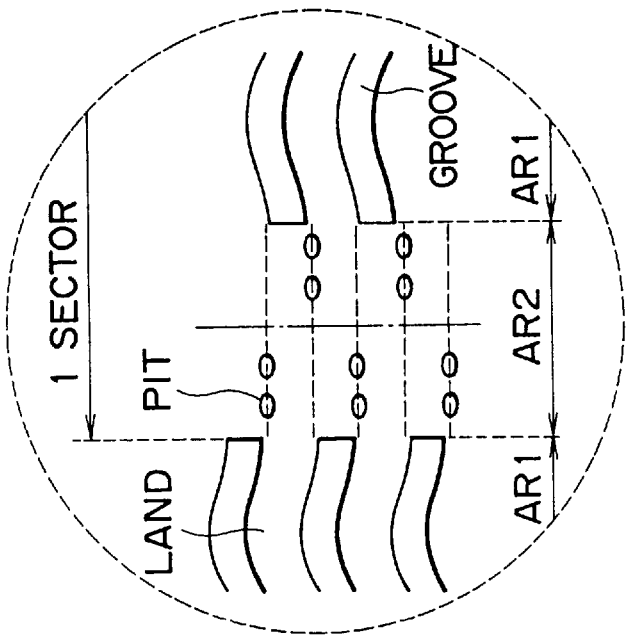
FIG. 18 is a plan view used for explanation of sectors formed by a mastering apparatus according to a further embodiment of this invention.
Figure 18A:
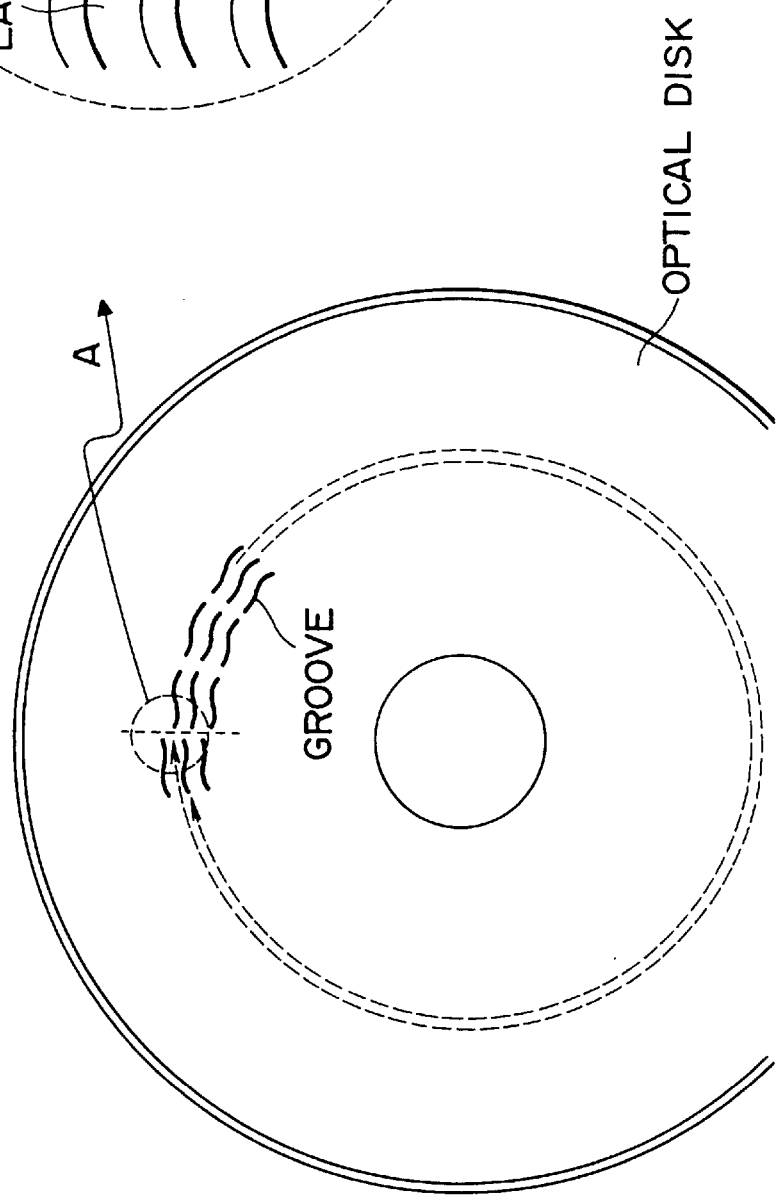

FIG. 18 is a plan view showing an optical disk according to another embodiment of the present invention (in comparison with FIG. 16). In the fabricating process of an optical disk according to this embodiment, grooves are formed in such a way that one round of a groove is followed by an outer land and one round of the land is followed by an outer groove. Further, the groove formation is stopped at a predetermined angular interval to record address data by a pit train, the address data being recorded in the first half and second half of address area AR2. The pit trains are placed on the boundaries of the groove and land respectively, with an offset existing between the first and second half portions.

The optical disk apparatus accesses the optical disk in the same way as in the lastmentioned embodiment of FIG. 16.

The configuration shown in FIG. 18 can be applied to the land/groove recording by alternate connection of a land and a groove, with the same effect as that in the last-mentioned embodiment of FIG. 16.

In the embodiments described above, 8K bytes of data are recorded as a pit train in one address area AR2. However, this invention is not limited to this; 2K- or 4K-byte data, for example, can be assigned.

In the embodiments described above, identical address IDs are repeated twice for recording. However, this invention is not limited to this; identical IDs can be repeated more than twice, or may not be repeated.

In the embodiments described above, grooves are wobbled by a wobble signal that is not modulated. However, this invention is not limited to this; the wobbling signal may be modulated so that the wobbled grooves contain information indicated by the modulation.

In the embodiments described above, the wobbling cycle of the grooves is changed in stages corresponding to zones. However, the invention is not limited to this, it can also apply to the case where the wobbling is kept constant regardless of the disk's angular velocity, the case where the wobbling cycle of the grooves is kept constant with respect to linear velocity, and the case where the wobbling cycle of grooves on a linear velocity basis is changed in order in stages in a radial direction of the optical disk.

In the embodiments of FIGS. 16 and 18 described above, the entire groove is wobbled by a wobble signal. However, this invention, not limited to this, it can also apply to the case where only one edge of a groove is wobbled, and the case where both edges of a groove are wobbled by different wobble signals.

In the first to fifth embodiments described above, access is started from a groove track. However, this invention is not limited to this; access may be started from a land track, or access may be started by alternately switching between land and groove tracks, depending on a zone.

In the embodiments of FIGS. 1 to 16 described above, a pair of groove and land tracks are spirally formed. However, this invention is not limited to this; two or more pairs of groove and land tracks may be spirally formed.

In the embodiments of FIGS. 1 to 16 described above, one track is spirally formed by switching between a land and a groove each time a track makes one round. However, this invention is not limited to this; one or more tracks may be spirally formed by switching between a land and a groove at a predetermined angular interval.

In the embodiments described above, grooves are formed by the land/groove recording so that a track pitch is 0.5 $\mu$m. However, the invention is not limited to this, it can apply to the case where grooves are formed with a different track pitch. More specifically, a capacity of 8 GB can be obtained by setting the track pitch to 0.64 $\mu$m or less, depending on the linear recording density, the redundancy of data to be recorded, and the like.

In the embodiments described above, the thickness of the light transmission layer is set to 0.1 mm. However, this invention is not limited to this; a capacity of 8 GB can be obtained by setting the thickness of the light transmission layer to 177 $\mu$m or less. Incidentally, the light transmission layer should have a thickness of at least 10 $\mu$m.

In the embodiments described above, user data is recorded at a linear recording density of 0.21 $\mu$m/bit. However, this invention, not limited to this, it can apply to recording at a linear recording density of 0.23 $\mu$m/bit while maintaining the same advantages as that in the above mentioned embodiments. When the linear recording density is represented in terms of bit length or mark length, the permissible shortest bit length and shortest mark length are 0.3 $\mu$m.

In the embodiments described above, data is recorded or reproduced by irradiating a laser beam having a wavelength of 650 nm via an optical system having a numerical aperture of 0.78. However, the invention is not limited to this, it can apply to the case where data is recorded at high density by an optical system having a higher numerical aperture. When the thickness of the light transmission layer and a practicable working distance are taken into account, the same results as that in the above mentioned embodiments can be obtained in the case of a numerical aperture of 0.78 or more and a working distance of 560 $\mu$m or less.

In the embodiments described above, the invention applies to recordable optical disks. However, the invention is not limited to this, it can also apply to reproduction only optical disks.

While the present invention has been particularly shown and described in conjunction with preferred embodiments thereof, it will be readily appreciated by those of ordinary skill in the art that various changes may be made without departing from the spirit and scope of the invention. For example, although the invention has been described in the context of recording/reproducing on both lands and grooves, to implement the invention in the context of recording on lands only, or in the context of recording on grooves only.

Therefore, it is intended that the appended claims be interpreted as including the embodiments described herein, the alternatives mentioned above, and all equivalents thereto.

What is claimed is:

1. An apparatus for accessing an optical storage disk, wherein said disk is made of a transparent layer having a thickness between 10 $\mu$m and 177 $\mu$m, and a recording layer having disposed thereon a multiple of recording tracks, said tracks being substantially concentric about the center of said disk, having a track pitch of 0.64 $\mu$m or less, and alternating radially between land tracks and groove tracks, wherein each land track is located on the surface of said recording layer and each groove track is located within a groove in said surface of said recording layer, said apparatus comprising:

means for rotating said disk;

means for irradiating a laser beam onto said rotating disk, said beam being generated by an optical system that is positioned at a working distance no greater than 560 $\mu$m from said disk and has a numerical aperture of at least 0.78;

means for detecting the position of said laser beam on said disk; and means for adjusting the rotation speed of said disk according to the detected beam position whereby said groove tracks are formed in a wobbled fashion according to a wobbling signal such that each said groove track is circular and sinusoidally shaped, and such that when said disk is accessed by rotating said disk at a substantially constant angular velocity said wobbling signal is reproduced and the reproduced wobbling signal increases in frequency as the radial position of said beam moves toward the outer edge of said disk and decreases in frequency as the radial position of said beam moves toward the inner portion of said disk so that the wavelength of the sinusoid remains substantially constant with respect to radial position on said disk.

2. The apparatus according to claim 1, wherein said means for adjusting comprises means for dividing the disk into a multiple of radial zones and adjusting the rotation speed of said disk according to the zone in which said beam position is located, such that as said beam position moves radially outward from the center of said disk the rotation speed of said disk is decreased in stages on a zone-by-zone basis.

3. The apparatus according to claim 2, wherein said apparatus is operable to access both groove tracks and land tracks within a given zone and further comprises:

means for accessing said groove tracks within said given zone sequentially in a radial direction that proceeds from the center of said disk outward;

means for accessing said land tracks within said given zone sequentially in a radial direction that proceeds from the center of said disk outward; and means for jumping from the outermost groove track of said given zone to the innermost land track of said given zone, or from the outermost land track of said given zone to the innermost groove track of said given zone.

4. The apparatus according to claim 2, wherein said apparatus is operable to access both groove tracks and land tracks and further comprises:

means for accessing said groove tracks sequentially in a radial direction that proceeds from the center of said disk outward;

means for accessing said land tracks sequentially in a radial direction that proceeds from the center of said disk outward; and means for jumping from the outermost groove track of said disk to the innermost land track of said disk, or from the outermost land track of said disk to the innermost groove track of said disk.

5. The apparatus according to claim 1, wherein data is recorded on and/or reproduced from only said groove tracks.

6. The apparatus according to claim 1, wherein data is recorded on and/or reproduced from only said land tracks.

7. The apparatus according to claim 1, wherein address data for at least one of said recording tracks is recorded on said optical storage disk in an area of groove discontinuity, and said apparatus is operable to read said address data.

8. The apparatus according to claim 1, wherein said apparatus is operable to record address data for at least one of said recording tracks onto said optical storage disk, said address data being located in an area of groove discontinuity, and said area being divided into two sections, a first section for storing groove address data and a second section for storing land address data.

9. An apparatus for accessing an optical storage disk, wherein said disk is made of a transparent layer having a thickness between 10 $\mu$m and 177 $\mu$m, and a recording layer having disposed thereon a multiple of recording tracks, said tracks being substantially concentric about the center of said disk, having a track pitch of 0.64 $\mu$m or less, and alternating radially between land tracks and groove tracks, wherein each land track is located on the surface of said recording layer and each groove track is located within a groove in said surface of said recording layer, said apparatus comprising:

means for rotating said disk;

means for irradiating a laser beam onto said rotating disk, said beam being generated by an optical system that is positioned at a working distance no greater than 560 $\mu$m from said disk and has a numerical aperture of at least 0.78;

means for detecting the position of said laser beam on said disk;

means for dividing the disk into a multiple of radial zones and adjusting the rotation speed of said disk according to the zone in which said beam position is located, such that as said beam position moves radially outward from the center of said disk the rotation speed of said disk is decreased in stages on a zone-by-zone basis, wherein said apparatus is operable to access both groove tracks and land tracks within a given zone;

means for accessing said groove tracks within said given zone sequentially in a radial direction that proceeds from the center of said disk outward;

means for accessing said land tracks within said given zone sequentially in a radial direction that proceeds from the center of said disk outward; and means for jumping from the outermost groove track of said given zone to the innermost land track of said given zone, or from the outermost land track of said given zone to the innermost groove track of said given zone.

10. An apparatus for accessing an optical storage disk, wherein said disk is made of a transparent layer having a thickness between 10 $\mu$m and 177 $\mu$m, and a recording layer having disposed thereon a multiple of recording tracks, said tracks being substantially concentric about the center of said disk, having a track pitch of 0.64 $\mu$m or less, and alternating radially between land tracks and groove tracks, wherein each land track is located on the surface of said recording layer and each groove track is located within a groove in said surface of said recording layer, and wherein said apparatus is operable to access both land tracks and groove tracks, said apparatus comprising:

means for rotating said disk;

means for irradiating a laser beam onto said rotating disk, said beam being generated by an optical system that is positioned at a working distance no greater than 560 $\mu$m from said disk and has a numerical aperture of at least 0.78;

means for detecting the position of said laser beam on said disk;

means for dividing the disk into a multiple of radial zones and adjusting the rotation speed of said disk according to the zone in which said beam position is located, such that as said beam position moves radially outward from the center of said disk the rotation speed of said disk is decreased in stages on a zone-by-zone basis;

means for accessing said groove tracks sequentially in a radial direction that proceeds from the center of said disk outward;

means for accessing said land tracks sequentially in a radial direction that proceeds from the center of said disk outward; and means for jumping from the outermost groove track of said disk to the innermost land track of said disk, or from the outermost land track of said disk to the innermost groove track of said disk.

* * * * *